United States Patent
Davis et al.

(10) Patent No.: US 10,952,497 B2
(45) Date of Patent: Mar. 23, 2021

(54) EXTRUDED COMPONENTS FOR ARTICLES OF FOOTWEAR AND METHODS OF MAKING THE SAME

(71) Applicant: Reebok International Limited, London (GB)

(72) Inventors: Paul Davis, Blackstone, MA (US); Dennis Gaboriault, Millbury, MA (US); Ricardo Vestuti, Providence, RI (US); Henry Hardigan, Pawtucket, RI (US); Frank Millette, Middleboro, MA (US); Michael Andrews, East Falmouth, MA (US)

(73) Assignee: Reebok International Limited, London (GB)

(*) Notice: Subject to any disclaimer, the term of this patent is extended or adjusted under 35 U.S.C. 154(b) by 132 days.

(21) Appl. No.: 16/100,825

(22) Filed: Aug. 10, 2018

(65) Prior Publication Data
US 2018/0343969 A1    Dec. 6, 2018

Related U.S. Application Data

(62) Division of application No. 14/945,077, filed on Nov. 18, 2015.

(51) Int. Cl.
*B29D 35/14* (2010.01)
*A43B 13/18* (2006.01)
(Continued)

(52) U.S. Cl.
CPC ............ *A43B 13/181* (2013.01); *A43B 13/12* (2013.01); *A43B 13/14* (2013.01); *A43B 13/184* (2013.01);
(Continued)

(58) Field of Classification Search
CPC ..... A43B 13/181; A43B 13/14; A43B 13/184; A43B 13/12; A43B 13/187; A43B 13/32;
(Continued)

(56) References Cited

U.S. PATENT DOCUMENTS 2,100,492 A   11/1937  Sindler
2,325,656 A    8/1943  Brophy
(Continued)

FOREIGN PATENT DOCUMENTS

CN       1066620 C    6/2001
CN    101820788 A    9/2001
(Continued)

OTHER PUBLICATIONS

European Search Report for European Application No. 16198878.7, European Patent Office, Munich, Germany, dated Apr. 21, 2017, 9 pages.

*Primary Examiner* — Jeffrey M Wollschlager
(74) *Attorney, Agent, or Firm* — Sterne, Kessler, Goldstein & Fox P.L.L.C.

(57) ABSTRACT

Extruded components for articles of footwear and methods of making such articles of footwear are disclosed. A carrier can be formed from a first material, the carrier including an attachment surface configured to attach to an upper and a receiving surface having a plurality of receptacles. A second material can be extruded into a plurality of the receptacles to form cushioning elements of a sole.

17 Claims, 36 Drawing Sheets

(51) Int. Cl.
*A43B 13/12* (2006.01)
*A43B 13/14* (2006.01)
*A43B 13/32* (2006.01)

(52) U.S. Cl.
CPC ............ *A43B 13/187* (2013.01); *A43B 13/32* (2013.01); *B29D 35/142* (2013.01)

(58) Field of Classification Search
CPC ........ A43B 7/32; A43B 13/04; B29D 35/142; B29D 35/122
See application file for complete search history.

(56) References Cited

U.S. PATENT DOCUMENTS

| | | | | |
|---|---|---|---|---|
| 2,931,110 | A * | 4/1960 | Pietrocola | B29D 35/081 36/30 R |
| 3,251,728 | A | 5/1966 | Humbert et al. | |
| 3,719,965 | A | 3/1973 | Chevallereau | |
| 4,160,331 | A * | 7/1979 | Bell | A43B 13/24 36/59 B |
| 4,272,898 | A | 6/1981 | Tansill | |
| 4,272,989 | A | 6/1981 | Rymarchyk et al. | |
| 4,431,311 | A | 2/1984 | Kolossow | |
| 4,536,974 | A | 8/1985 | Cohen | |
| 4,593,482 | A | 6/1986 | Mayer | |
| 4,611,412 | A | 9/1986 | Cohen | |
| 4,753,021 | A | 6/1988 | Cohen | |
| 4,754,559 | A | 7/1988 | Cohen | |
| 4,899,467 | A * | 2/1990 | Mackey | A43B 13/12 36/31 |
| 4,952,450 | A | 8/1990 | Noel | |
| 5,063,018 | A | 11/1991 | Fontirroche et al. | |
| 5,233,767 | A | 8/1993 | Kramer | |
| 5,713,140 | A | 2/1998 | Baggenstoss | |
| 5,916,006 | A | 6/1999 | Ganson | |
| 5,951,935 | A * | 9/1999 | Healy | B29C 44/0461 156/247 |
| 6,098,313 | A * | 8/2000 | Skaja | A43B 13/181 36/28 |
| 6,280,478 | B1 | 8/2001 | Richter | |
| 6,782,642 | B2 | 8/2004 | Knoche | |
| 7,192,069 | B1 | 3/2007 | Daniel | |
| 7,926,204 | B2 | 4/2011 | Ungari et al. | |
| 8,181,361 | B2 * | 5/2012 | Kimura | A43B 13/181 36/25 R |
| 8,993,061 | B2 | 3/2015 | Jones et al. | |
| 9,321,199 | B2 * | 4/2016 | Stone | A43B 7/1425 |
| 9,420,848 | B2 * | 8/2016 | Campos, II | B29C 51/267 |
| 2006/0288612 | A1 | 12/2006 | Lucas et al. | |
| 2007/0170610 | A1 | 7/2007 | Payne et al. | |
| 2007/0266593 | A1 | 11/2007 | Schindler et al. | |
| 2008/0115389 | A1 | 5/2008 | Hsieh | |
| 2008/0271339 | A1 | 11/2008 | Fischer | |
| 2009/0013558 | A1 * | 1/2009 | Hazenberg | A43B 13/16 36/88 |
| 2009/0094858 | A1 | 4/2009 | Ungari et al. | |
| 2009/0126225 | A1 | 5/2009 | Jarvis | |
| 2009/0247658 | A1 | 10/2009 | Kobayashi | |
| 2010/0192420 | A1 * | 8/2010 | Favraud | A43B 13/186 36/3 B |
| 2011/0016746 | A1 | 1/2011 | Callahan et al. | |
| 2011/0154584 | A1 | 6/2011 | Ungari et al. | |
| 2011/0232130 | A1 | 9/2011 | Boudreau et al. | |
| 2012/0180344 | A1 | 7/2012 | Crowley, II | |
| 2013/0145650 | A1 | 6/2013 | Seo | |
| 2013/0260104 | A1 | 10/2013 | Dua et al. | |
| 2013/0274365 | A1 * | 10/2013 | Torres | C08G 18/10 521/170 |
| 2013/0318831 | A1 * | 12/2013 | Foxen | B29D 35/0054 36/25 R |
| 2014/0020192 | A1 | 1/2014 | Jones | |
| 2014/0151918 | A1 * | 6/2014 | Hartmann | B29C 44/1285 264/46.5 |
| 2014/0230276 | A1 | 8/2014 | Campos, II et al. | |
| 2014/0246804 | A1 * | 9/2014 | Maranan | A43B 13/127 264/250 |
| 2014/0250730 | A1 * | 9/2014 | Rosenberger | A43B 13/122 36/103 |
| 2014/0265016 | A1 * | 9/2014 | Nguyen | B29D 35/0081 264/255 |
| 2014/0310986 | A1 * | 10/2014 | Tamm | D04B 1/16 36/84 |
| 2015/0040428 | A1 * | 2/2015 | Davis | B29D 35/142 36/83 |
| 2015/0282558 | A1 * | 10/2015 | Rawls-Meehan | A43B 3/0057 36/31 |
| 2015/0289586 | A1 * | 10/2015 | Wan | A43B 13/16 36/31 |
| 2015/0321434 | A1 * | 11/2015 | Sterman | B29C 70/745 264/255 |
| 2016/0219982 | A1 | 8/2016 | Waatti | |
| 2016/0345666 | A1 * | 12/2016 | Kohatsu | A43B 7/144 |
| 2017/0121480 | A1 * | 5/2017 | Farris | B29C 44/3457 |

FOREIGN PATENT DOCUMENTS

| | | |
|---|---|---|
| CN | 1817261 A | 8/2006 |
| CN | 101052513 A | 10/2007 |
| CN | 201005124 Y | 1/2008 |
| CN | 103260450 A | 8/2013 |
| CN | 204617210 U | 9/2015 |
| CN | 105025745 A | 11/2015 |
| DE | 1279314 B | 10/1968 |
| EP | 0130816 A2 | 1/1985 |
| EP | 2 684 479 | 1/2014 |
| WO | WO 97/03582 | 2/1997 |
| WO | WO 2009057107 A2 | 5/2009 |
| WO | 2014/009587 A1 | 1/2014 |
| WO | WO 2014100462 A1 | 6/2014 |
| WO | WO 2017083013 A1 | 5/2017 |

* cited by examiner

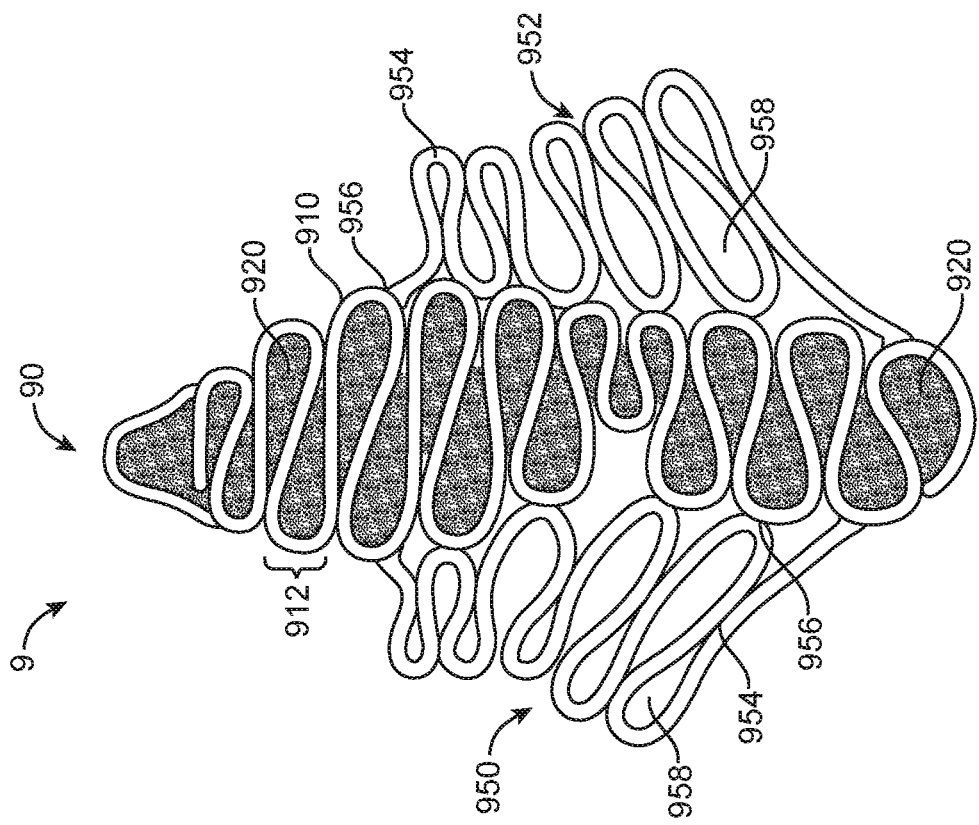
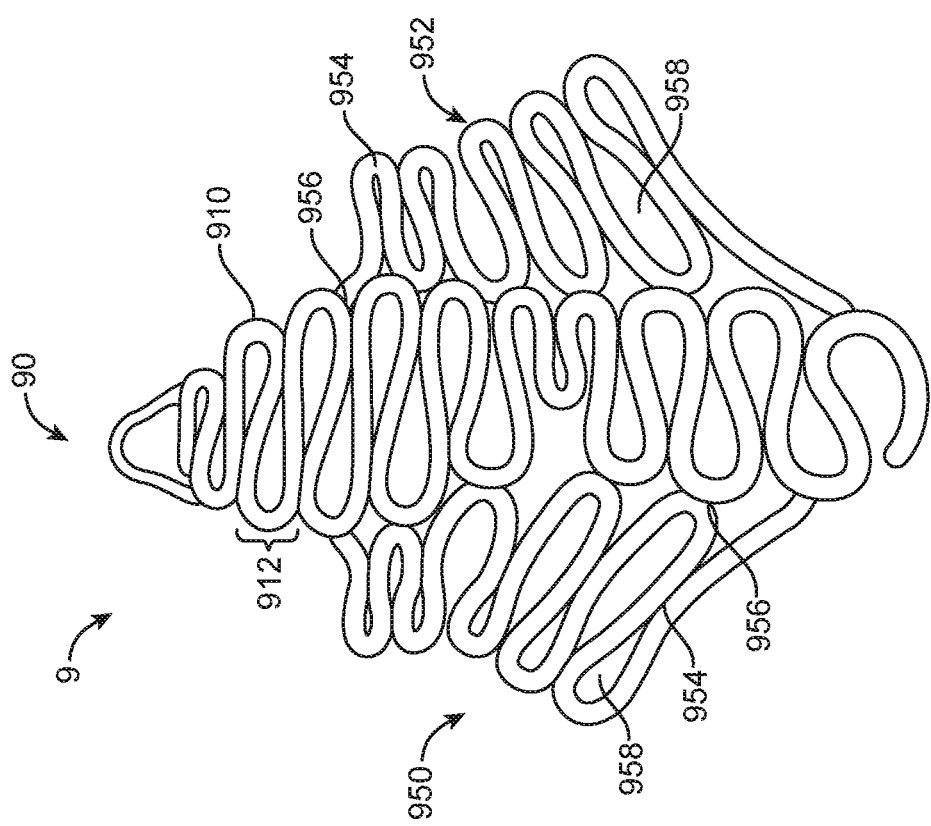

EXTRUDED COMPONENTS FOR ARTICLES OF FOOTWEAR AND METHODS OF MAKING THE SAME

CROSS-REFERENCE TO RELATED APPLICATION

This application is a divisional of U.S. application Ser. No. 14/945,077, filed Nov. 11, 2015, which is hereby incorporated herein in its entirety by reference.

FIELD

The present disclosure relates to articles of footwear and methods of making articles of footwear. More specifically, the present disclosure relates to embodiments of footwear and components of footwear made from extruded or dispensed materials.

BACKGROUND

Individuals can be concerned with the amount of cushioning an article of footwear provides, as well as the aesthetic appeal of the article of footwear. This is true for articles of footwear worn for non-performance activities, such as a leisurely stroll, and for performance activities, such as running, because throughout the course of an average day, the feet and legs of an individual are subjected to substantial impact forces. When an article of footwear contacts a surface, considerable forces may act on the article of footwear and, correspondingly, the wearer's foot. The sole functions, in part, to provide cushioning to the wearer's foot and to protect it from these forces. To achieve adequate cushioning, many footwear soles are thick and heavy. When sole size and/or weight are reduced to achieve other performance goals, protection of the wearer's foot is often compromised.

The human foot is a complex and remarkable piece of machinery, capable of withstanding and dissipating many impact forces. The natural padding of fat at the heel and forefoot, as well as the flexibility of the arch, help to cushion the foot. Although the human foot possesses natural cushioning and rebounding characteristics, the foot alone is incapable of effectively overcoming many of the forces encountered during every day activity. Unless an individual is wearing footwear that provides proper cushioning, support, and flexibility, the soreness and fatigue associated with every day activity is more acute, and its onset accelerated. The discomfort for the wearer that results may diminish the incentive for further activity. Also, inadequate cushioning, support, or flexibility in an article of footwear can lead to injuries such as blisters; muscle, tendon and ligament damage; and bone stress fractures. Improper footwear can also lead to other ailments, including back pain.

BRIEF SUMMARY

A method of making a sole for an article of footwear can include forming a carrier from a first material. The carrier can include an attachment surface configured to attach to an upper and a receiving surface having a plurality of receptacles. The method can further include extruding a second material into a plurality of the receptacles. In certain embodiments, at least one receptacle can be formed as a cavity in the receiving surface of the carrier. In certain embodiments, at least one receptacle can be a protrusion extending from the receiving surface of the carrier. The protrusion can have a sidewall defining a rim and an interior cavity.

In certain embodiments, the first material can be a thermoplastic or thermoset material, for example, but not limited to thermoplastic polyurethane (TPU). In certain embodiments, the carrier can be formed by vacuum forming a TPU film. In certain embodiments, the first material can be ethylene-vinyl acetate (EVA). In certain embodiments, the first material can be nylon. In certain embodiments, the carrier can be formed by injecting the first material into a mold. In certain embodiments, the second material can be, for example, a two-part polyurethane, reactive elastomer, or foam. In certain embodiments, the method can include curing the second material, such as using a UV cure enhancement. In certain embodiments, the method can include determining a pressure profile of a foot, and the second material can be deposited into the receptacles according to the pressure profile.

In certain embodiments, the second material can be extruded into the receptacle until the second material reaches the rim of the receptacle. In certain embodiments, the second material can be extruded into the receptacle until the second material is beyond the rim of the receptacle. In certain embodiments, the first material and the second material can be different. In certain embodiments, two different materials can be deposited into a single receptacle. In certain embodiments, a third material can be deposited into at least one receptacle.

In certain embodiments, the carrier can have a forefoot region, a midfoot region, and a heel region. In certain embodiments, a receptacle in the heel region can have an interior volume greater than a receptacle in the midfoot region. In certain embodiments, a receptacle in the midfoot region can have an interior volume greater than a receptacle in the forefoot region. In certain embodiments, a receptacle in the heel region can have a rim that follows a rear contour of the heel region. In certain embodiments, a majority of the receptacles can have a circular rim. The quantity and shape of the receptacles can vary for certain applications. For example, in certain embodiments, the carrier can have 10, 25, or 50 receptacles.

In certain embodiments, at least one receptacle can be formed as a cavity in the receiving surface of the carrier. In certain embodiments, at least one receptacle can have a concave interior surface. The depth of the receptacle cavity can be configured to different depths depending the on the particular application. For example, in certain embodiments, a depth of the receptacle cavity can be at least 1, 5, or 10 millimeters. In certain embodiments, at least one receptacle can share a sidewall with an adjacent receptacle. In certain embodiments, at least one receptacle can have a rectangular rim. In certain embodiments, at least one receptacle can have a hexagonal rim. The receptacle can be circular, oval, triangular, organically shaped, or any other shape.

A method of making an article of footwear can include forming a carrier from a first material. In certain embodiments, the carrier can include an attachment surface configured to attach to an upper and a receiving surface having a plurality of receptacles. In certain embodiments, a second material can be extruded into a plurality of the receptacles. In certain embodiments, the carrier can be attached to the upper. In certain embodiments, the carrier can be attached to the upper by an adhesive. In certain embodiments, the attachment surface of the carrier can be concave and attached to a bottom surface of the upper. In certain embodiments, the attachment surface can have a sidewall configured to contact an exterior surface of the upper.

An article of footwear can include an upper and a carrier attached to the upper. In certain embodiments, the carrier can include an attachment surface configured to attach the carrier to the upper and a receiving surface having a plurality of receptacles. In certain embodiments, a plurality of cushioning elements can be disposed in the receptacles. In certain embodiments, at least one receptacle can include a protrusion extending from the receiving surface of the carrier. In certain embodiments, the protrusion can have a sidewall defining a rim and an interior cavity. In certain embodiments, at least one cushioning element can extend beyond the rim of a protrusion. In certain embodiments, at least one cushioning element can be an extruded material having a dome-shaped exterior surface. In certain embodiments, the carrier can be a thermoplastic polyurethane (TPU) or ethylene-vinyl acetate (EVA) film and at least one cushioning element can be a polyurethane elastomer or polyurethane foam.

In certain embodiments, at least one cushioning element can be an extruded material. In certain embodiments, at least one cushioning element can be an injected material. In certain embodiments, a material of a first cushioning element can be different than a material of a second cushioning element.

In certain embodiments, the carrier can have a forefoot region, a midfoot region, and a heel region. In certain embodiments, a receptacle in the heel region can have an interior volume greater than a receptacle in the midfoot region. In certain embodiments, a receptacle in the midfoot region can have an interior volume greater than a receptacle in the forefoot region. In certain embodiments, a receptacle in the heel region can have a rim that follows a rear contour of the heel region.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant arts to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIGS. 37A-B illustrate an article of footwear according to an embodiment.

DETAILED DESCRIPTION

Figure 1:
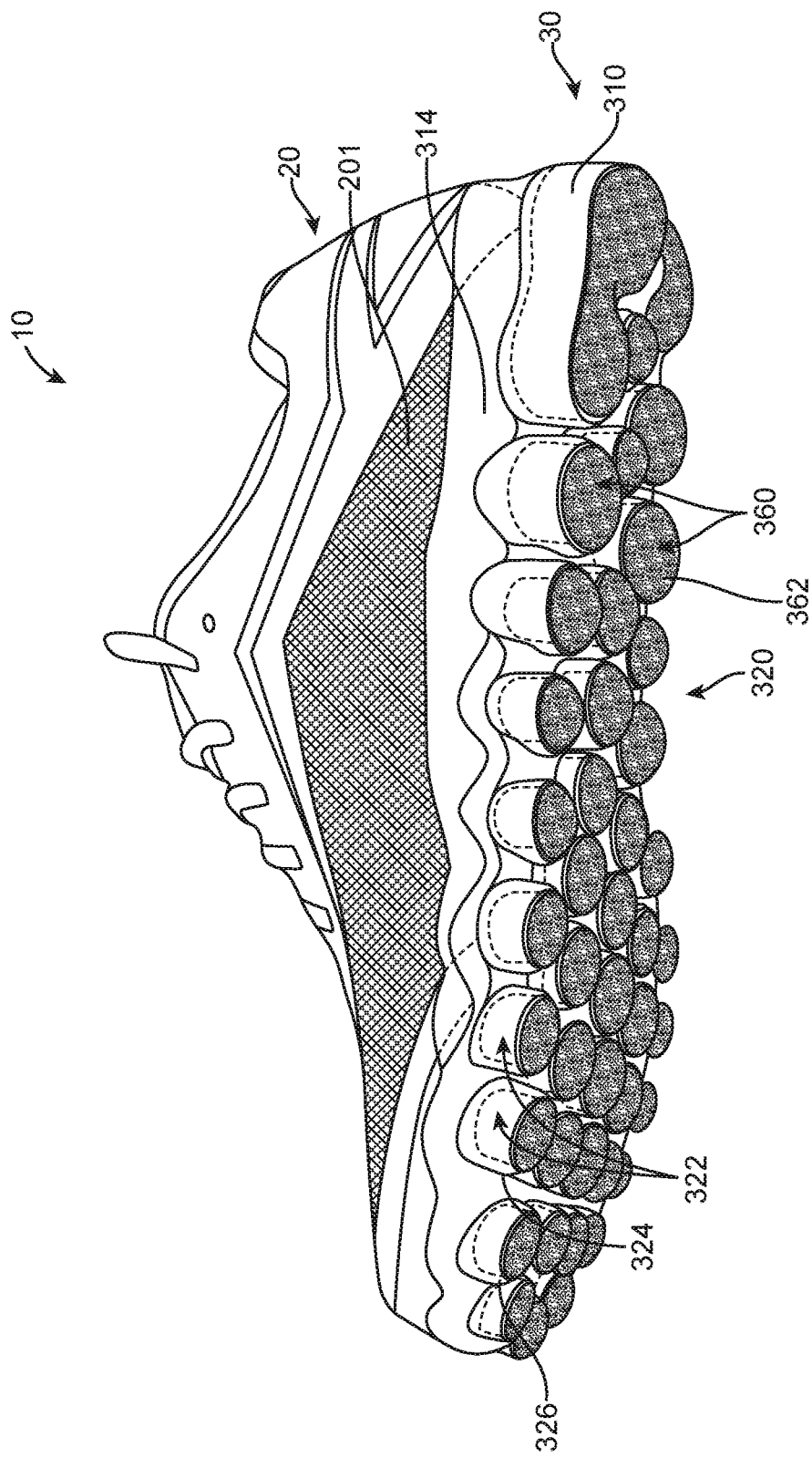
FIG. 1 illustrates a perspective view of an article of footwear according to an embodiment.

Embodiments of the present disclosure will now be described in detail with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It is understood that the term "sole" can refer to an entire sole for an article of footwear, or any portion of a sole for an article of footwear. For example, "sole" can refer to an outsole, midsole, insole, or any portion or combination thereof "Sole" can refer to a forefoot area, midfoot area, or rearfoot area of a sole, or any portion or combination thereof.

It is understood that while the term "extruded" is generally used herein to refer to certain materials, these materials may also be "dispensed," for example, dispensed from a mechanical device.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Embodiments described herein relate to articles of footwear, soles for articles of footwear, and methods of making the same. In certain embodiments the sole can include a carrier portion having a receiving surface with a plurality of receptacles. A second and/or third material can be extruded into the receptacles to form cushioning elements of the sole. The sole can be attached to an upper to form an article of footwear.

FIG. 1 illustrates an article of footwear 10 according to an embodiment. Article of footwear 10 can include an upper 20 having an exterior surface 201 and a sole 30. In certain embodiments, sole 30 can include carrier 310 and cushioning elements 360. In certain embodiments, carrier 310 can have an attachment surface 312, which can be configured to attach carrier 310 to upper 20. In certain embodiments, attachment surface 312 of carrier 310 can be concave such that it is contoured to generally conform to the bottom of the wearer's foot or a midsole or bottom portion of an upper. In certain embodiments, carrier 310 can have sidewalls 314 which can contact exterior surface 201 of upper 20. Sidewall 314 can facilitate attaching sole 30 to upper 20. In certain embodiments an adhesive, stitching, tape, rivets, hook-and-loop, or other mechanical means or combinations thereof can be used to attach carrier 310 to upper 20.

Carrier 310 can be formed by various processes, for example, by vacuum forming, compression molding, injection molding, dip molding, rotational molding, rapid prototyping, or additive manufacturing. Carrier 310 can include materials, for example, but not limited to polymers, rubbers, and/or foams. For example, carrier 310 can be made of thermoplastic polyurethane (TPU) or ethylene-vinyl acetate (EVA). In certain embodiments, carrier 310 can be vacuum formed from a TPU film. In certain embodiments, carrier 310 can be formed by injecting EVA into a mold. Carrier 310 can be made from other suitable materials and can be transparent, opaque, or colored. In certain embodiments, carrier 310 can be transparent such that the cushioning elements 360 within the receptacles 322 can be seen through the exterior of carrier 310. Texturing, symbols, logos, indicia, and/or lettering can be included on an exterior surface of carrier 310, for example, on sidewall 314.

In certain embodiments, carrier 310 can include receiving surface 320, which can be configured to receive cushioning elements 360. In certain embodiments, receiving surface 320 can have one or more receptacles 322 formed within receiving surface 320 or extending therefrom. Generally, receiving surface 320 can have a plurality of receptacles 322. Receptacles 322 can be configured to receive cushioning elements 360. Any number of receptacles 322 can be included as part of carrier 310, for example, 10, 20, 30, 40, or more receptacles 322. The receptacles 322 can be various shapes and sizes and can be disposed in various locations and patterns along receiving surface 320 of carrier 310. In certain embodiments, receptacles 322 can be disposed in rows across a width of carrier 310 and/or in columns along a length of carrier 310. Configurations of receptacles 322 other than those specifically described herein are contemplated. In certain embodiments, receptacles 322 can be cavities in receiving surface 320 (see, for example, FIG. 7A).

The shape of receptacles 322 can vary depending on the desired functional and/or aesthetic characteristics. For example, receptacles 322 can be circular, rectangular, square, or hexagonal shaped cavities in receiving surface 320, or organic free-form shapes. In certain embodiments, receptacles 322 can project from receiving surface 320 and have a hollow interior space. In certain embodiments, receptacles 322 can have a sidewall 324 and a rim 326. For example, in certain embodiments, a plurality of receptacles 322 can be cylindrical (i.e., having a circular rim). In certain embodiments, receptacles 322 can be a free-form shape, for example, to follow a contour of a heel portion of carrier 310.

Cushioning elements 360 can be disposed in receptacles 322. As described in further detail herein, in certain embodiments, a material can be extruded directly into receptacles 322 to form cushioning elements 360. In certain embodiments, cushioning elements 360 can be pre-fabricated and inserted into receptacles 322 like a plug and maintained in place by frictional or adhesive forces. In certain embodiments, cushioning elements 360 can act as an outsole. In certain embodiments, an additional outsole material (not shown) can be disposed on some or all of cushioning elements 360.

Figure 2:
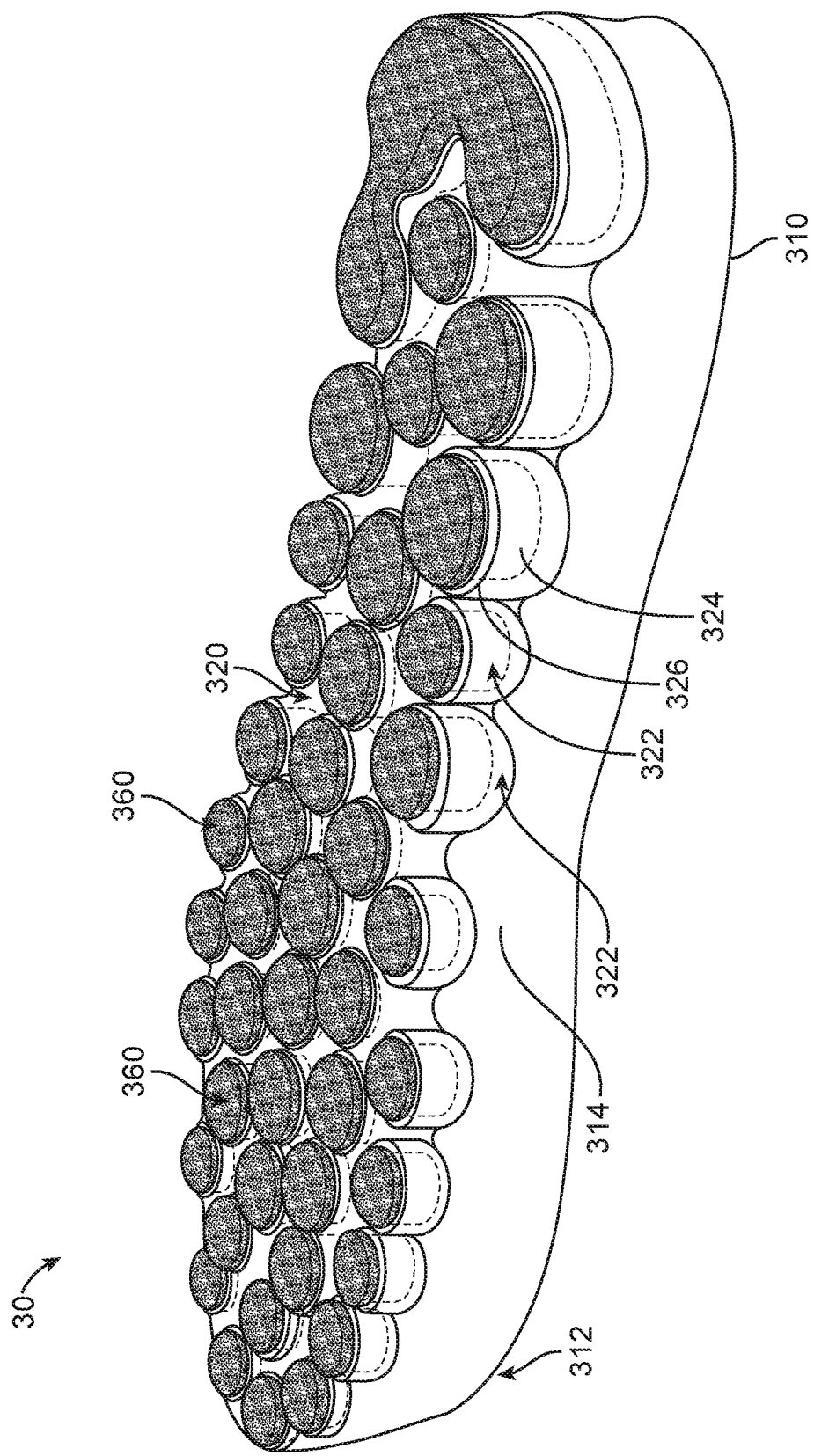
FIG. 2 illustrates a bottom perspective view of a sole for an article of footwear according to an embodiment.

FIG. 2 illustrates sole 30 according to an embodiment. In certain embodiments, sole 30 can include carrier 310 and cushioning elements 360. As shown in FIG. 2, in certain embodiments, a plurality of receptacles 322 can extend from receiving surface 320 of carrier 310. Cushioning elements 360 can be disposed within a hollow interior volume of receptacles 322. In certain embodiments, the material for cushioning elements 360 can be extruded into receptacles 322. In certain embodiments, an exterior surface 362 of cushioning elements 360 can extend beyond rim 326 of receptacles 322. Various shapes, sizes, patterns, and configurations of receptacles 322 are contemplated. In certain embodiments, receptacles 322 can be generally cylindrical in shape and extend from receiving surface 320. In certain embodiments, receptacles 322 can be other shapes, for example, but not limited to, rectangular, square, triangular, hexagonal, or any other suitable shape. In certain embodiments, receptacles 322 can be spaced from each other such that each receptacle is a separate unit. In certain embodiments, receptacles 322 can be contiguous, i.e. sharing sidewalls 324 like a honeycomb.

Figure 3:
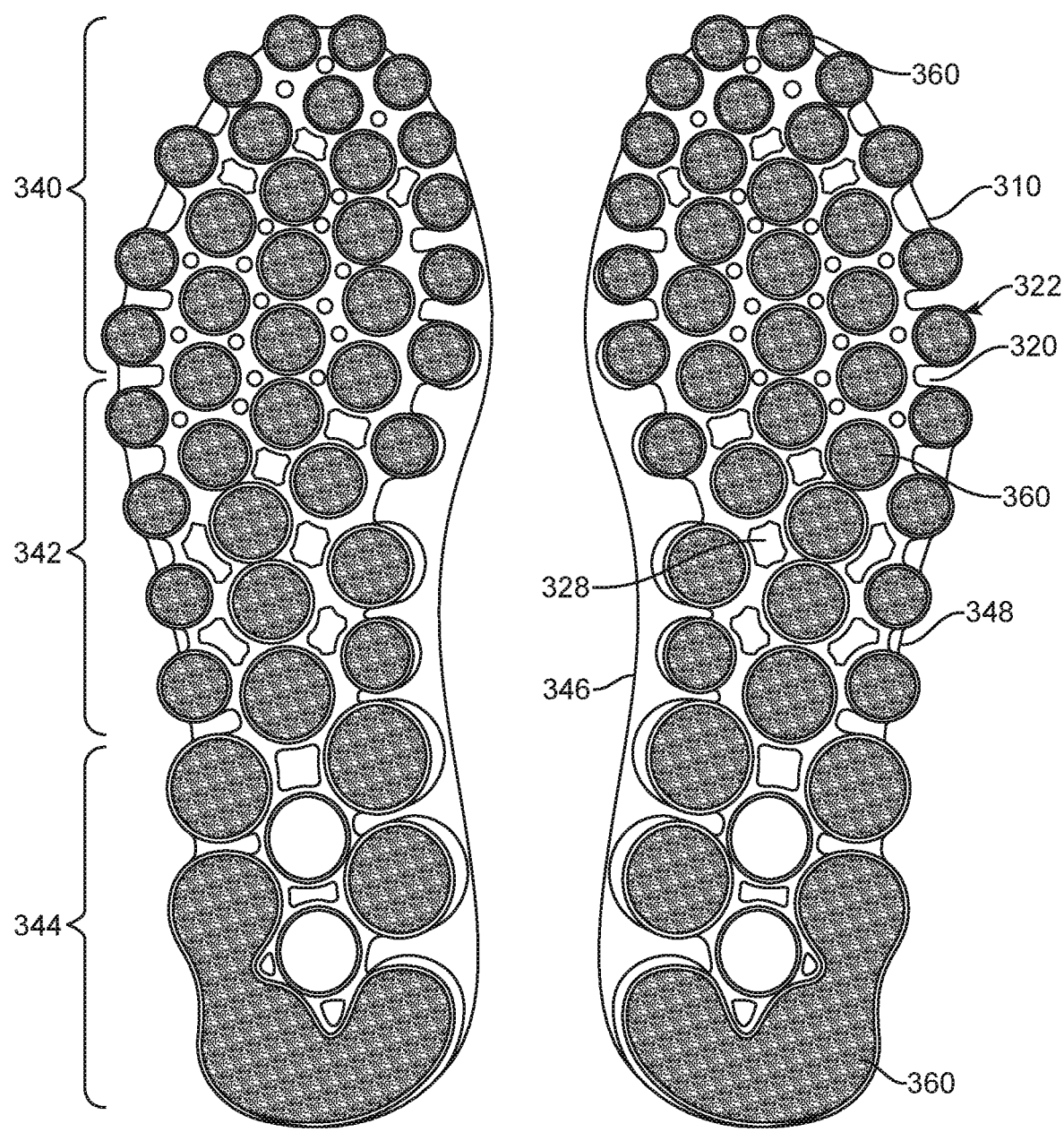
FIG. 3 illustrates a bottom view of soles for articles of footwear according to an embodiment.

FIG. 3 illustrates left and right soles 30 according to embodiments. In certain embodiments, in addition to receptacles 322, carrier 310 can have cavities 328 in receiving surface 320. Cavities 328 can reduce the overall amount of material used for carrier 310, and therefore reduce the weight of carrier 310. Cavities 328 can also be filled with additional cushioning elements 360 if desired. Cavities 328 can be various shapes and sizes to fit between receptacles 322.

As shown, for example, in FIG. 3, the soles 30 can have a forefoot region 340, a midfoot region 342, and a heel region 344. Soles 30 can have a medial side 346 and a lateral side 348. In certain embodiments, regions 340, 342, and 344 can each be about a one third of the length of sole 30. However, each region can be larger or smaller than one third of the length of sole 30. In certain embodiments, the average size of the receptacles 322 (and associated cushioning elements 360) in each region 340, 342, and 344 can be different. For example, in certain embodiments, heel region 344 can have larger receptacles 322 than midfoot region 342, which in turn can have larger receptacles 322 than forefoot region 340. The size, shape, and pattern of receptacles 322 can be configured to provide a different stability and cushioning profile to the sole 30. For example, a large receptacle 322 (and cushioning element 360) located in the heel region 344 can provide additional cushioning for the wearer's heel and a number of smaller receptacles 322 (and cushioning elements 360) in the forefoot region 340 can provide flexibility and grip for the wearer's toes.

Figure 4:
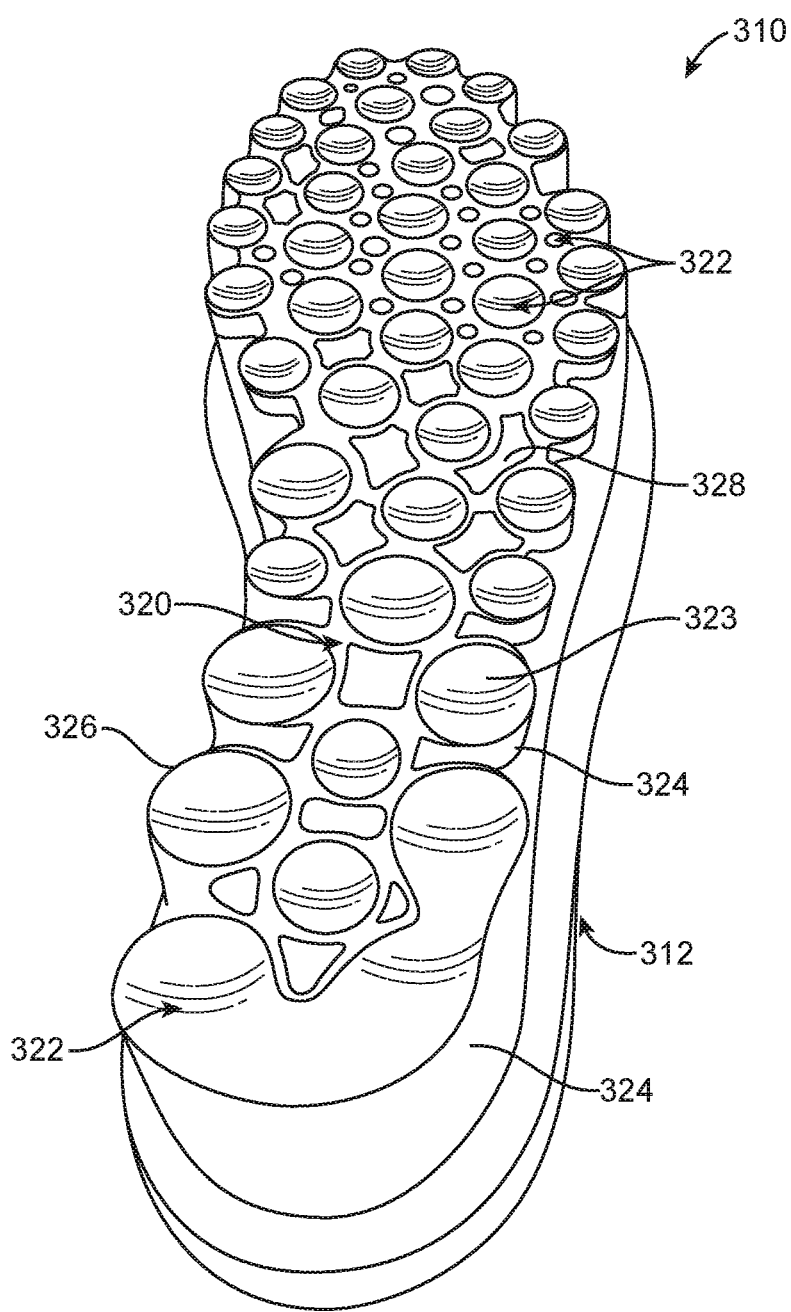
FIG. 4 illustrates a bottom perspective view of a carrier portion of a sole for an article of footwear according to an embodiment.

FIG. 4 illustrates carrier 310 according to an embodiment. In FIG. 4, carrier 310 is shown without any cushioning elements 360 disposed within the receptacles 322. As shown in FIG. 4, in certain embodiments, receptacles 322 can have an interior surface 323. In certain embodiments, interior surface 323 can be concave, such that the receptacle 322 provides an interior volume into which material for cushioning elements 360 can be disposed. In certain embodiments, receptacles 322 can have a depth, for example, of approximately 1, 5, 10, or 20 millimeters or more, measured from the plane of the rim 326 to the deepest part of the receptacle 322. Additional cavities 328 can also be included in receiving surface 320 of carrier 310. Cavities 328 can be various shapes and sizes. In certain embodiments, internal cavity 328 of a receptacle 322 can have an internal shape, for example, a convex dome, before the material for the cushioning element 360 is dispensed into receptacle 322.

Figure 5:
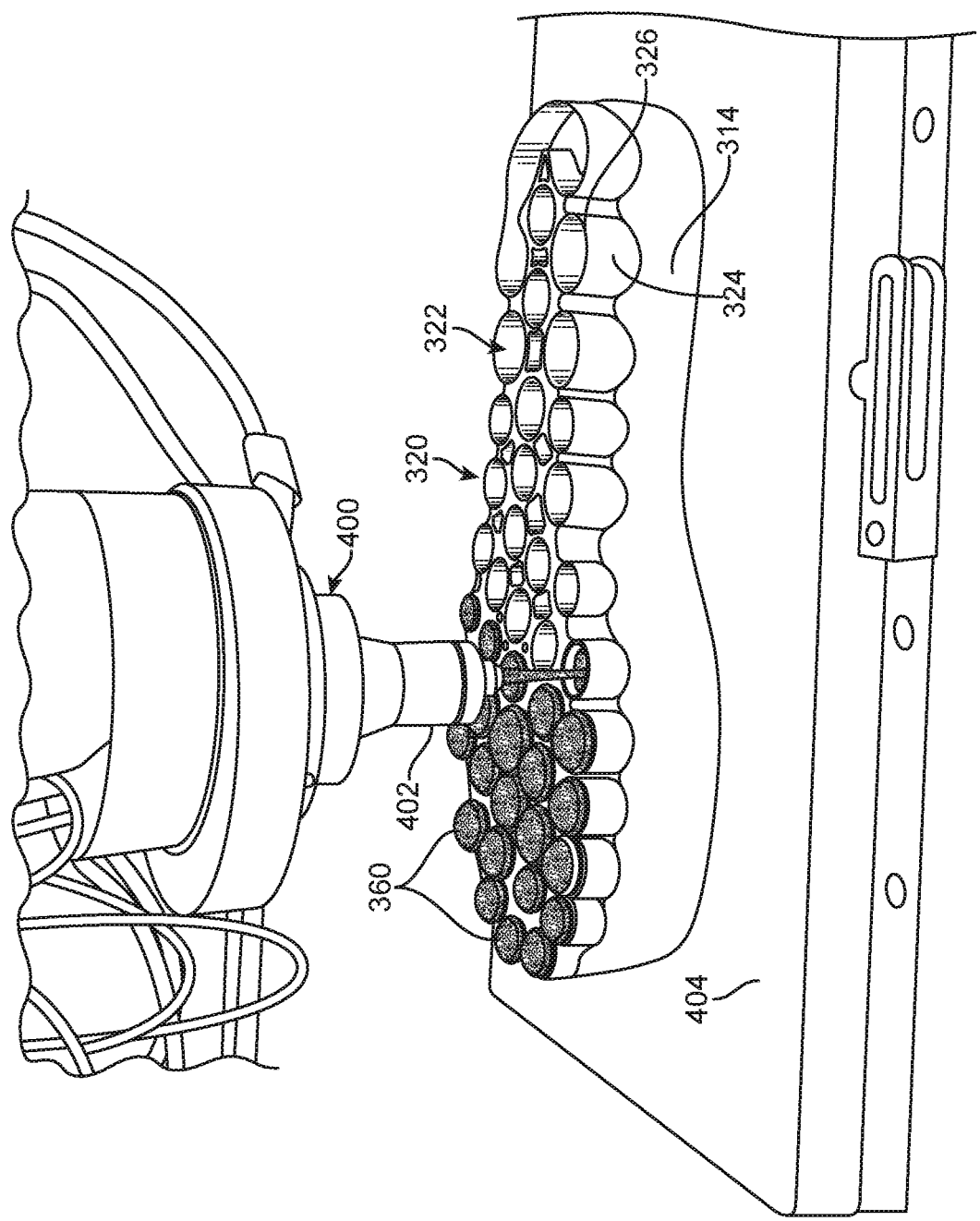
FIG. 5 illustrates extrusion of a material into receptacles in a carrier portion of a sole for an article of footwear according to an embodiment.

As shown in FIG. 5, in certain embodiments, an extruder 400 can extrude material into receptacles 322 of carrier 310. In certain embodiments, movement of extruder 400 can be controlled by using computer-aided design (CAD) or other computer design software. In certain embodiments, computerized numerical control (CNC) can be used to control extruder 400 (e.g., a three-axis pneumatic extruder) in order to precisely extrude material into receptacles 322. Variables such as, but not limited to, the size and shape of the dispensing orifice (i.e., extrusion die), dispensing pressure, dispensing temperature, dispensing viscosity, dispensing height, table axis, and table speed can be adjusted as desired. In certain embodiments, a 6-axis machine can be used when dispensing material into receptacles 322.

In certain embodiments, carrier 310 can be placed on plate 404 during the extrusion process. In certain embodiments, extruder 400 and/or plate 404 can move in a pre-designated pattern, for example, controlled by a computer, such that material is extruded only into receptacles 322. The extruder 400 can also be manually operated.

In certain embodiments, extruder 400 can include a nozzle 402 out of which a heated or non-heated material, for example, polyurethane elastomer or polyurethane foam can be extruded. In certain embodiments, the extruded material can exit the nozzle 402 in a liquid-like form and as it cools or cross-links, solidifies into cushioning elements 360. In certain embodiments, as cushioning elements 360 cool or cross-link, the volume expands. In certain embodiments, material can be extruded into receptacles 322 such that the material extends above the rim 326 of the receptacle 322. In certain embodiments, surface tension can prevent the extruded material from overflowing. This can form cushioning elements with a dome-shaped exterior surface 362. In certain embodiments, an additional curing process can be used to set the material for cushioning elements 360. In certain embodiments, in their final state, cushioning elements 360 can have a spongy texture and feel to act as shock absorbing material. In certain embodiments, cushioning elements 360 can be made from a material durable enough to form part of an outsole for sole 30.

Figure 6:
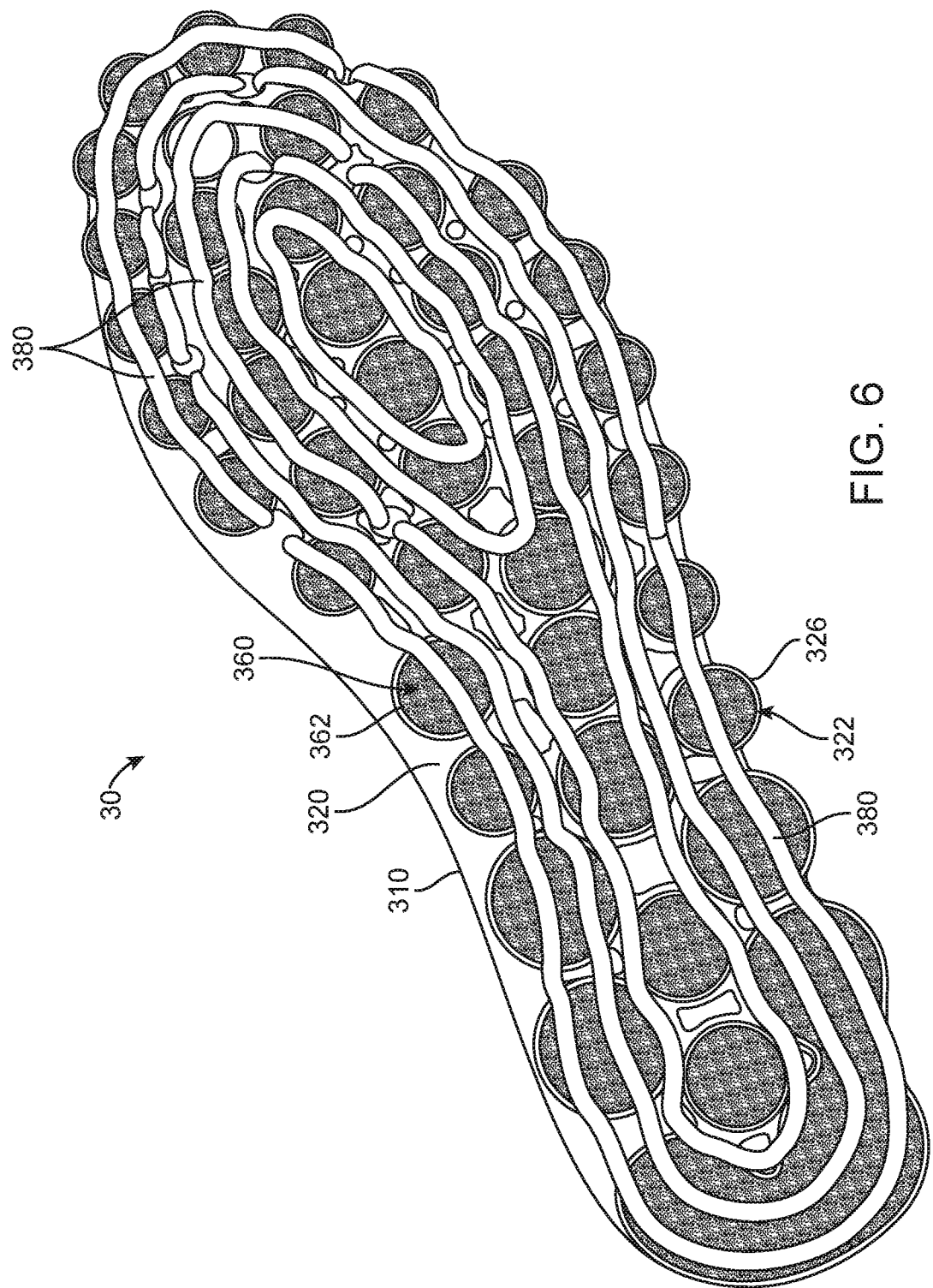
FIG. 6 illustrates a bottom view of a sole for an article of footwear according to an embodiment.

FIG. 6 illustrates sole 30 according to an embodiment. As depicted in FIG. 6, in certain embodiments, one or more elongated extruded members 380 can be extruded onto sole 30. Extruded members 380 can provide additional cushioning and/or support to sole 30. Various patterns of continuous and non-continuous extruded members 380 can be extruded onto sole 30. For example, one or more extruded members 380 can be extruded onto and/or between cushioning elements 360 and receptacles 322. Different patterns of extruded members 380 are contemplated, for example, but not limited to those described in U.S. patent application Ser. No. 14/455,650, filed Aug. 8, 2014, which is incorporated by reference herein in its entirety.

Figure 7B:
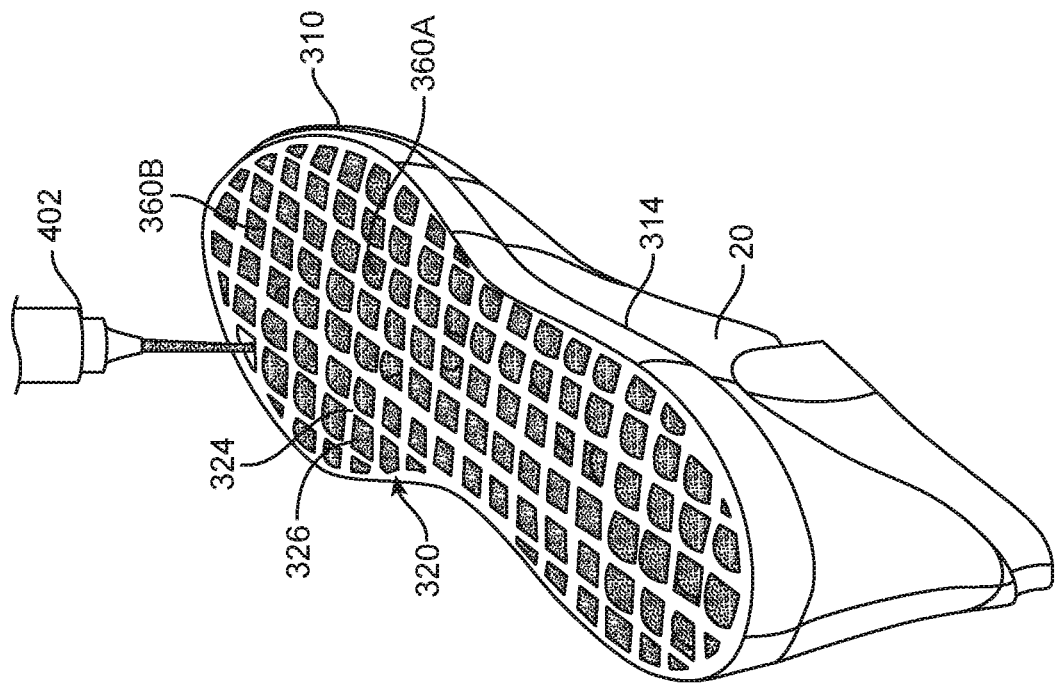
FIG. 7B illustrates extrusion of a material into receptacles of a carrier portion of a sole for an article of footwear according to an embodiment.
Figure 7A:
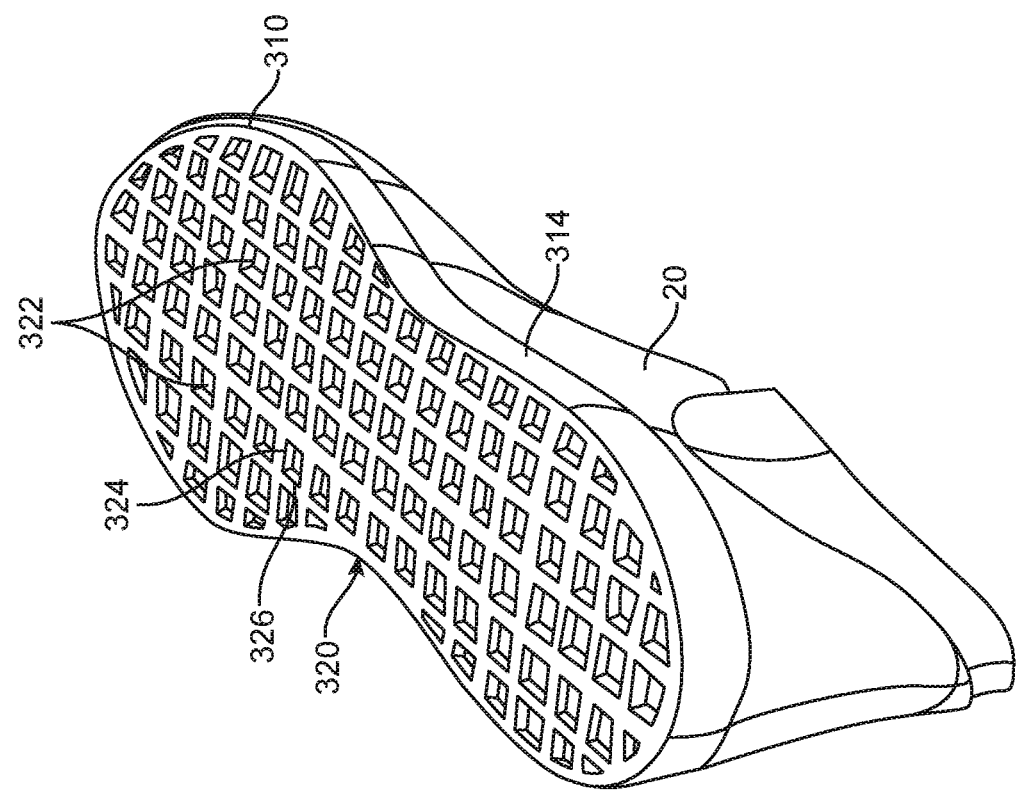
FIG. 7A illustrates a bottom perspective view of an article of footwear according to an embodiment.

FIGS. 7A and 7B illustrate an article of footwear 10 according to embodiments. FIG. 7A illustrates carrier 310 without any material extruded into receptacles 322. In the embodiment shown in FIG. 7A, receptacles 322 are formed as cavities in receiving surface 320. Each cavity can have a rim 326 and a shared sidewall 324 with an adjacent receptacle 322, forming a matrix of receptacles. Various shapes and sizes of receptacles 322 can be included in receiving surface 320. In certain embodiments, receptacles 322 can be connected, for example, by a hole through a shared sidewall 324.

FIG. 7B illustrates cushioning elements 360 being extruded from nozzle 402 into receptacles 322. As shown by the different shading of the cushioning elements 360A and 360B, in certain embodiments, different types of material can be extruded into receptacles 322. For example, certain receptacles can be filled with a more dense material to provide greater stability. In certain embodiments, two different materials can be extruded into the same receptacle 322. In certain embodiments, cushioning elements 360 of different receptacles 322 can be connected, for example through a hole in a shared sidewall 324 or by overflow of the extruded material over the sidewall 324. The pattern of material for cushioning elements 360 can be determined according to a general pressure profile for wearers or it can be customized to a particular pressure profile of a wearer.

Figure 8:
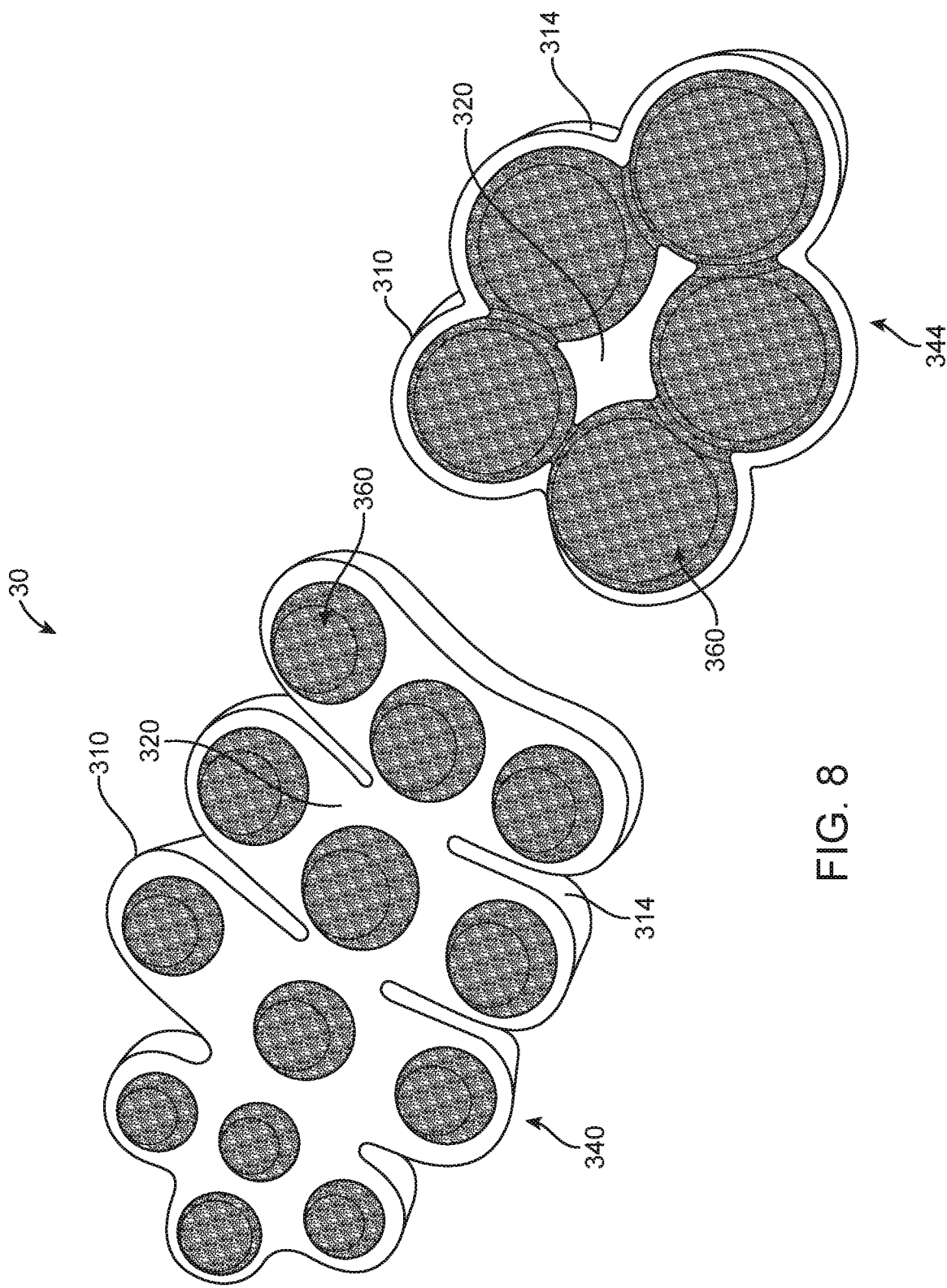
FIG. 8 illustrates a sole for an article of footwear according to an embodiment.

FIG. 8 illustrates a sole 30 according to an embodiment. As shown in FIG. 8, in certain embodiments, sole 30 can be made of a plurality of separate pieces. For example, sole 30 can include a forefoot region 340 and a heel region 344, but not include a midfoot region. As shown in FIG. 8, in certain embodiments, carrier 310 can have a thickness, for example, the thickness of sidewall 314. In certain embodiments, cushioning elements 360 can be extruded directly onto receiving surface 320 of carrier 310. In certain embodiments, cushioning elements 360 can be extruded into cavities or receptacles in the receiving surface 320 of carrier 310 and overflow such that cushioning elements 360 extend from receiving surface 320. In certain embodiments, receiving elements 360 can be extruded such that adjacent cushioning elements 360 contact one another, for example, as shown in heel region 344.

Figure 9:
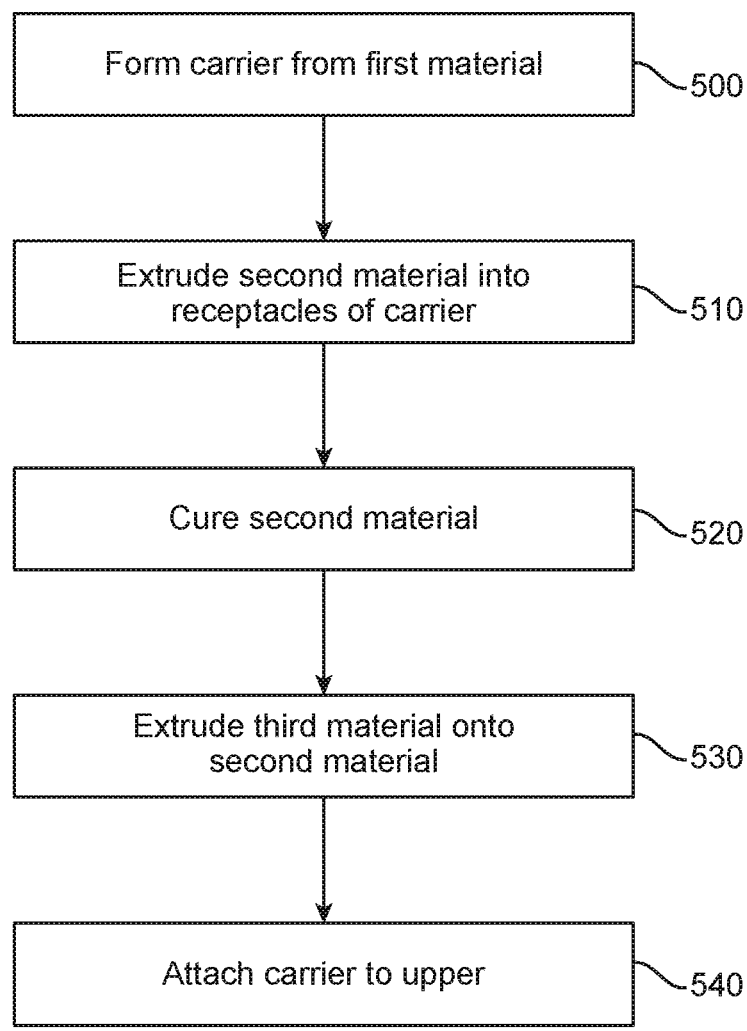
FIG. 9 illustrates a process for making an article of footwear according to an embodiment.

FIG. 9 illustrates a method of making an article of footwear according to an embodiment. In step 500, a carrier can be formed from a first material. For example, a carrier can be vacuum formed from TPU film or EVA can be injected into a mold. In step 510, a second material can be extruded into receptacles of the carrier. The second material can form the cushioning elements. In certain embodiments, the second material can be extruded until it reaches a rim of the receptacles. In certain embodiments, the second material can be extruded beyond a rim of the receptacles. In step 520, the second material can be cured, for example, to harden the second material that is extruded into the receptacles. In step 530, a third material can be extruded onto the second material. In step 540, the carrier can be attached to an upper, thereby forming an article of footwear. In certain embodiments, an adhesive can be used to attach the carrier with the upper. It is contemplated that not all of these steps are required for every embodiment. For example, in certain embodiments, the material for the cushioning elements may not need to be cured or a third material may not be extruded onto the second material. The method can also be used only to make the sole for an article of footwear, i.e., by not including the step of attaching the carrier to the upper.

Figure 10:
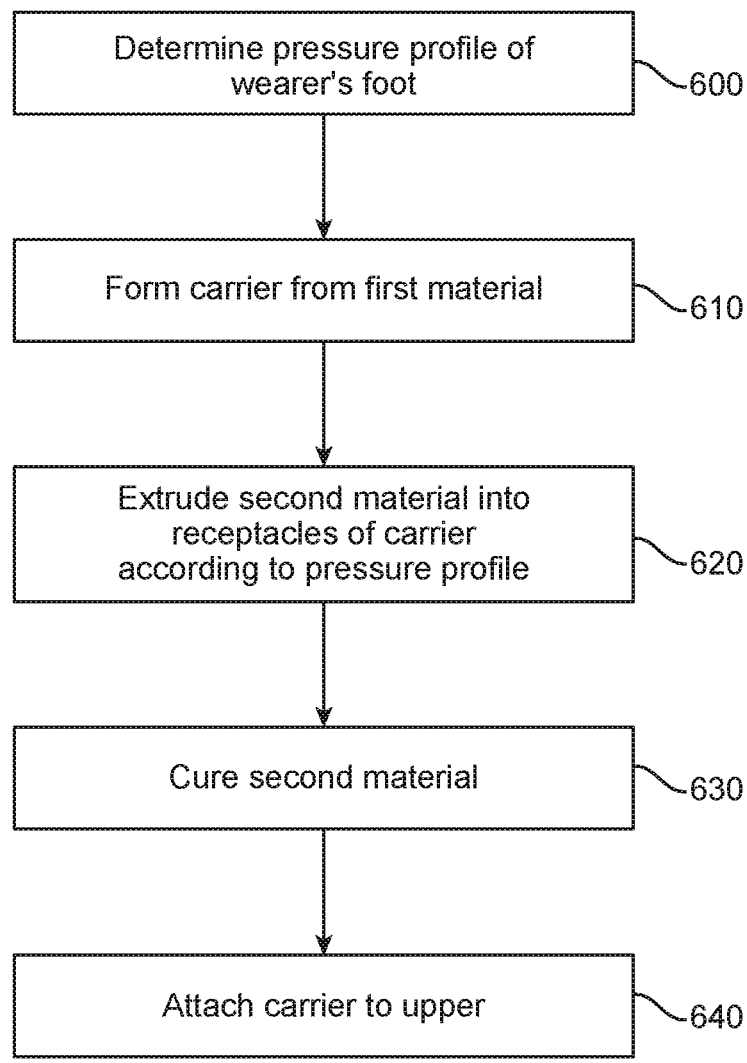
FIG. 10 illustrates a process for making an article of footwear according to an embodiment.

FIG. 10 illustrates a method of making an article of footwear, according to an embodiment. This method can be used to make a customized sole for a particular wearer. In step 600, a pressure profile of a wearer's foot can be determined. For example, the wearer can step onto a pressure sensor that can determine how pressure is distributed across the wearer's feet when standing. This information can be analyzed by a computer and used, for example, to determine a pattern for the receptacles of the carrier and/or the type of material(s) to be extruded into the receptacles. In step 610, a carrier can be formed from a first material. In step 620, a second material can be extruded into receptacles of the carrier according to the pressure profile. In certain embodiments, a third material can be extruded into receptacles of the carrier according to the pressure profile. In step 630, the second material can be cured, if needed. In step 640, the carrier can be attached to an upper, thereby forming an article of footwear.

Figure 11:
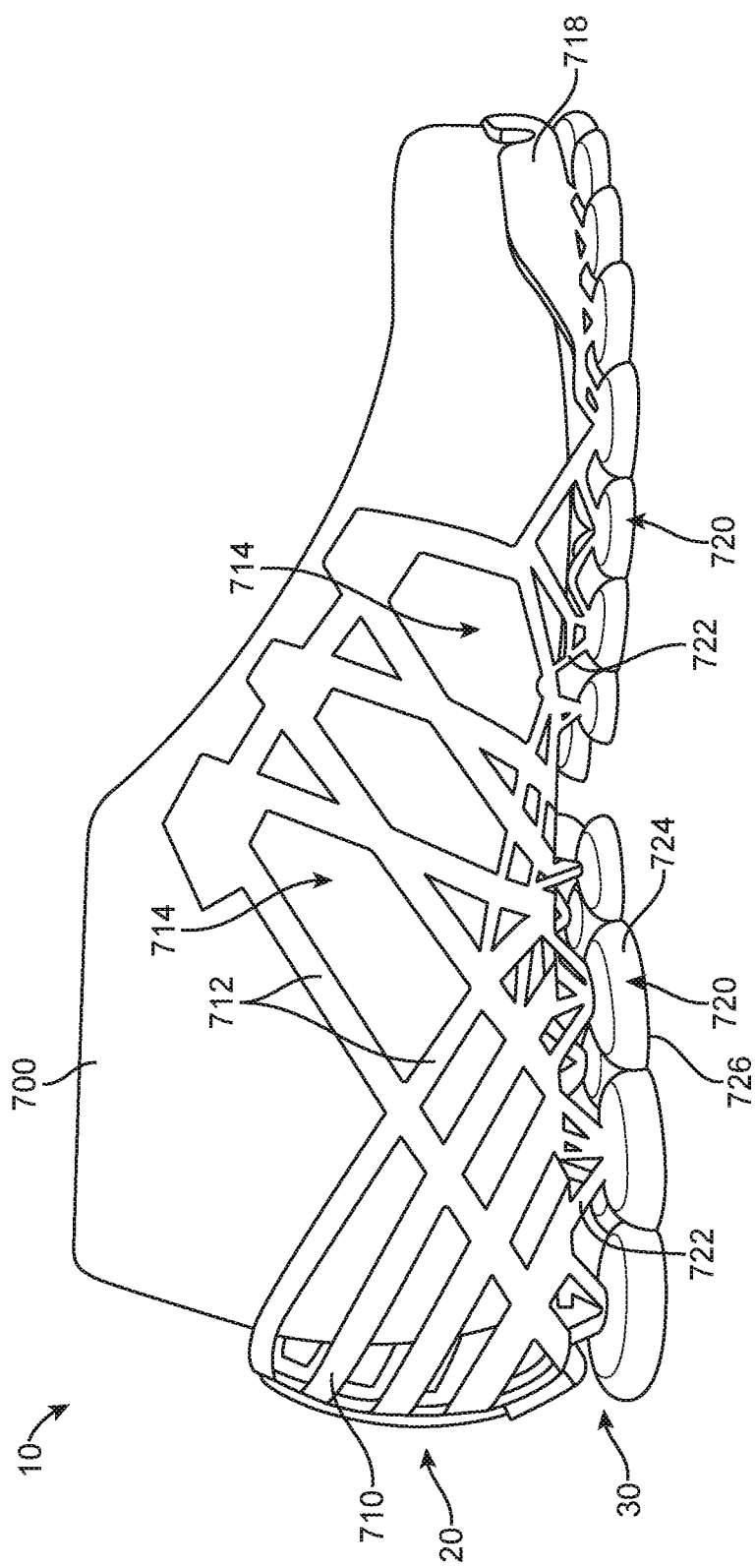
FIG. 11 illustrates a medial side perspective view of an article of footwear according to an embodiment.

FIG. 11 illustrates an article of footwear 10 according to an embodiment. Article of footwear 10 is shown disposed about a last 700. In certain embodiments, article of footwear 10 can include upper 20 and sole 30. In certain embodiments, upper 20 can include exoskeleton 710, which itself can be the structure of upper 20 or form a base layer for upper 20. In certain embodiments, exoskeleton 710 can have a plurality of ribs 712 with spaces 714 therebetween. The ribs 712 can be similar or different widths and can be disposed at various angles to form exoskeleton 710. In certain embodiments, spaces 714 between ribs 712 can be smaller where more support is desired for that area of exoskeleton 710, for example, in a heel portion of exoskeleton 710.

In certain embodiments, sole 30 can be coupled with exoskeleton 710 via webbing 722. In certain embodiments, webbing 722 can extend from sole 30 and interlace with exoskeleton 710. In certain embodiments, sole 30 can be integrally formed with exoskeleton 710 or attached, for example, by an adhesive. In certain embodiments, sole 30 can include cups 720, which can be akin to the receptacles described herein. In certain embodiments, cups 720 can have an outer surface 724 and a rim 726. In certain embodiments, webbing 722 can couple outer surface 724 of cup 720 with exoskeleton 710.

Figure 12:
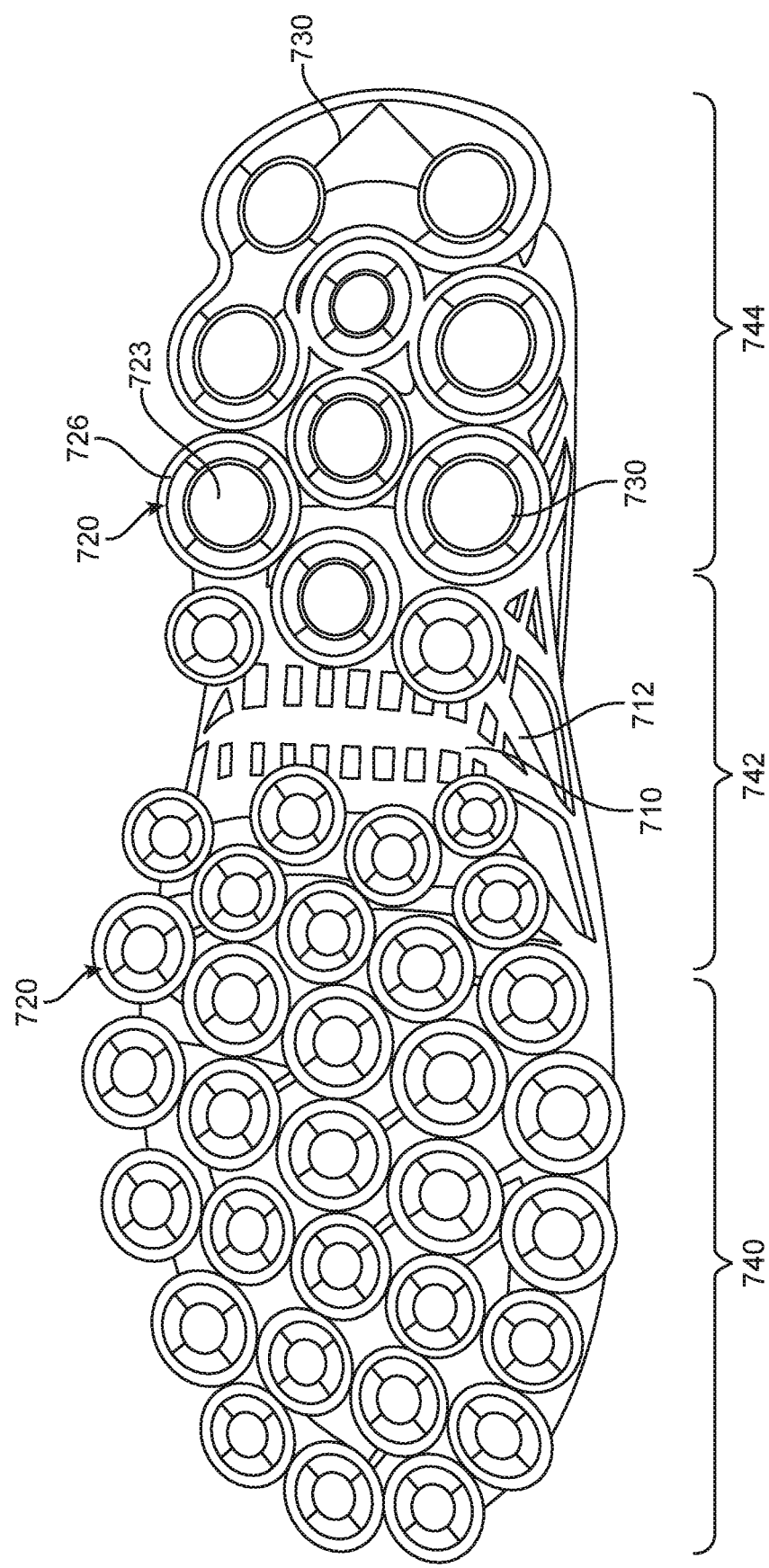
FIG. 12 illustrates a bottom view of an article of footwear according to an embodiment.

FIG. 12 illustrates a bottom view of an article of footwear 10 according to an embodiment. Like other embodiments described herein, sole 30 can include a forefoot region 740, a midfoot region 742, and a heel region 744. Like the receptacles described herein, cups 720 can be various shapes and sizes and can be disposed in various locations and patterns. In certain embodiments, cups 720 can have a circular rim 726. In certain embodiments, cups 720 can have a free-form shape. In certain embodiments, cups 720 can have a concave interior surface 723, which can be configured to receive extruded material that forms cushioning elements (not shown) as described with respect to other embodiments herein.

In certain embodiments, cups 720 can include frame 730, which can provide additional structure and support within cups 720. In certain embodiments, a portion of frame 730 can be similar in shape to rim 726 of cup 720 and connected to rim 726 of cups 720 by branches. In certain embodiments, portions of the sole 30, for example, a midfoot region 742, can be without cups 720.

Figure 13:
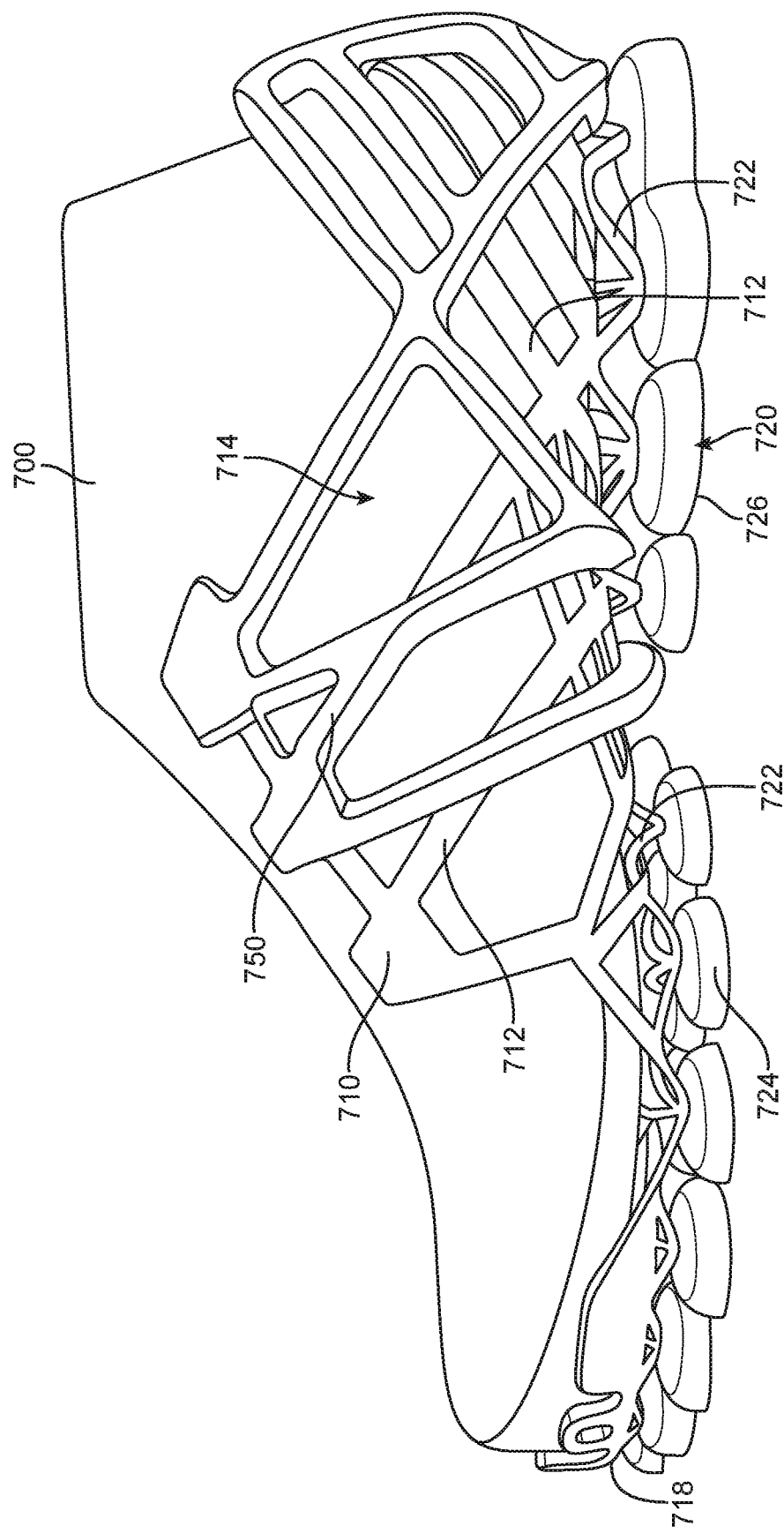
FIG. 13 illustrates a lateral side perspective view of an article of footwear according to an embodiment.

FIG. 13 illustrates a lateral side of an article of footwear 10 according to an embodiment. In certain embodiments, exoskeleton 710 can include toe box 718. In certain embodiments, covering 750 can be disposed over all or a portion of exoskeleton 710. Covering 750 can be the same material as exoskeleton 710 or a different material. In certain embodiments, exoskeleton 710 and/or covering 750 can be formed by fused deposition modeling, or other additive manufacturing techniques. Additionally, exoskeleton 710 can be formed by more traditional molding processes such as injection molding. Covering 750 can provide additional strength, structure, and geometric features to exoskeleton 710. For example, covering 750 can reinforce ribs 712. In certain embodiments, fabric can be disposed over exoskeleton 710 thereby forming an upper 20 of the article of footwear 10.

Figure 14:
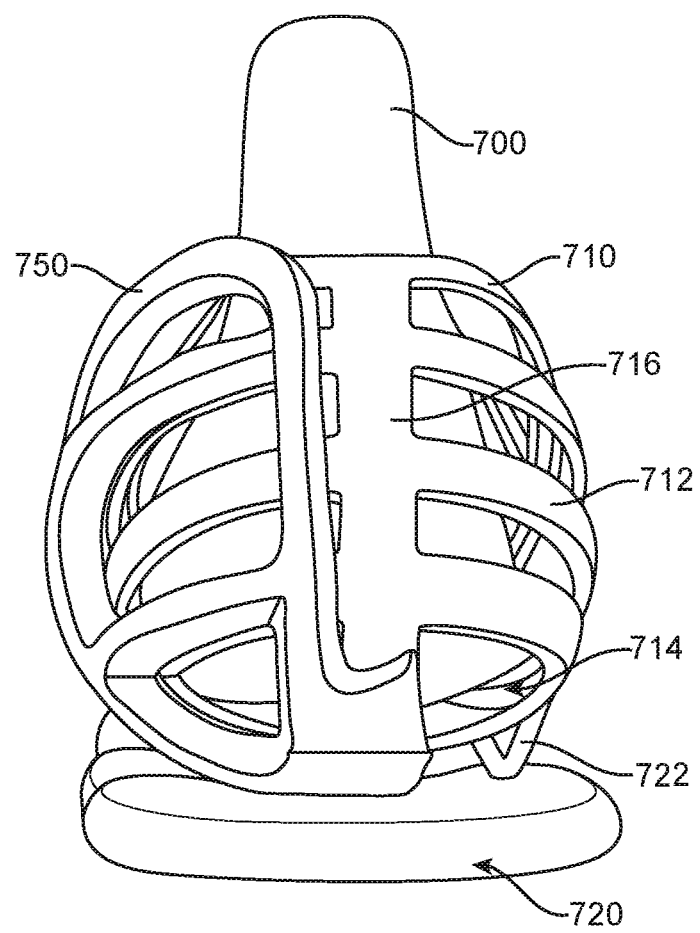
FIG. 14 illustrates a rear view of an article of footwear according to an embodiment.

FIG. 14 illustrates a rear or heel portion of an article of footwear 10 according to an embodiment. In certain embodiments, the heel portion of exoskeleton 710 can include a spine 716 running along a central portion of the heel. Spine 716 can provide support for the wearer's heel. In certain embodiments, ribs 712 can extend from spine 716. In certain embodiments, covering 750 can be disposed onto exoskeleton 710 of the heel portion.

Figure 15:
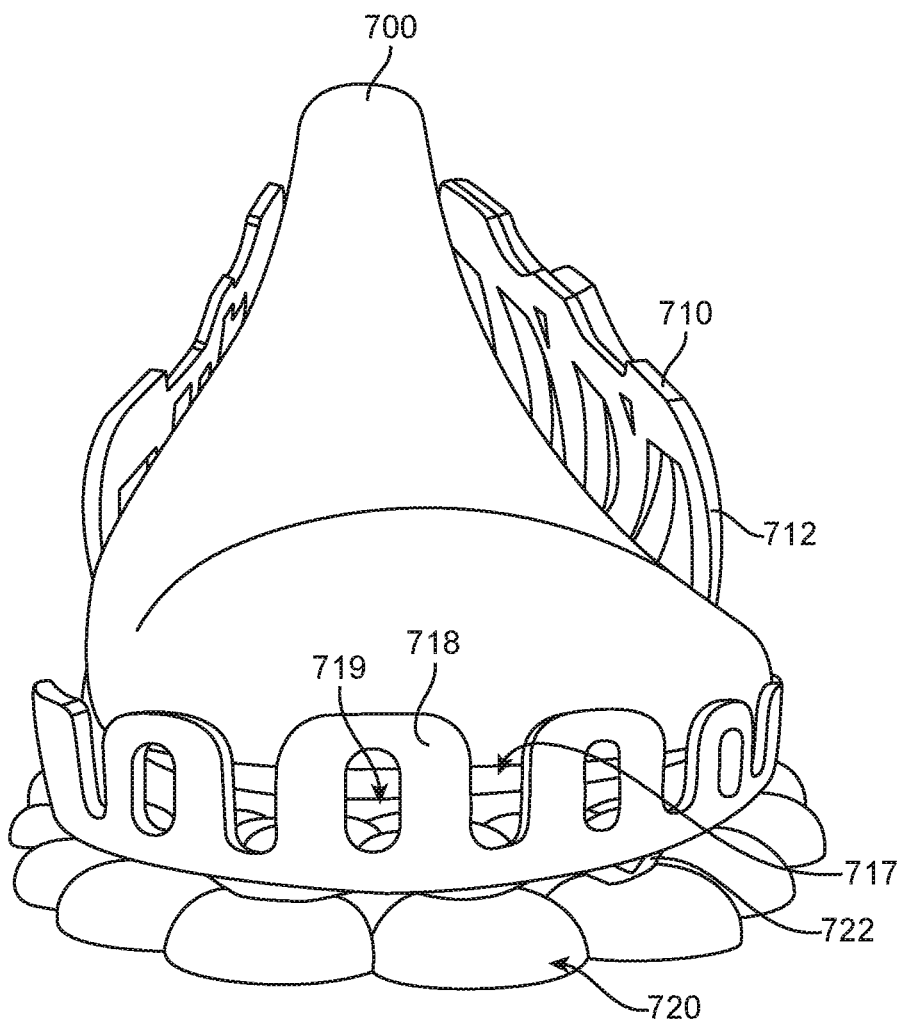
FIG. 15 illustrates a front view of an article of footwear according to an embodiment.

FIG. 15 illustrates a front or toe portion of an article of footwear 10 according to an embodiment. In certain embodiments, toe box 718 can have one or more holes 719 and/or spaces 717 between portions of toe box 718. The holes 719 can provide attachment points, for example, for fabric that overlays exoskeleton 710 to form upper 20. In certain embodiments, toe box 718 can be solid piece of material without any holes. In certain embodiments, the material of toe box 718 can form an undulating pattern.

Figure 16:
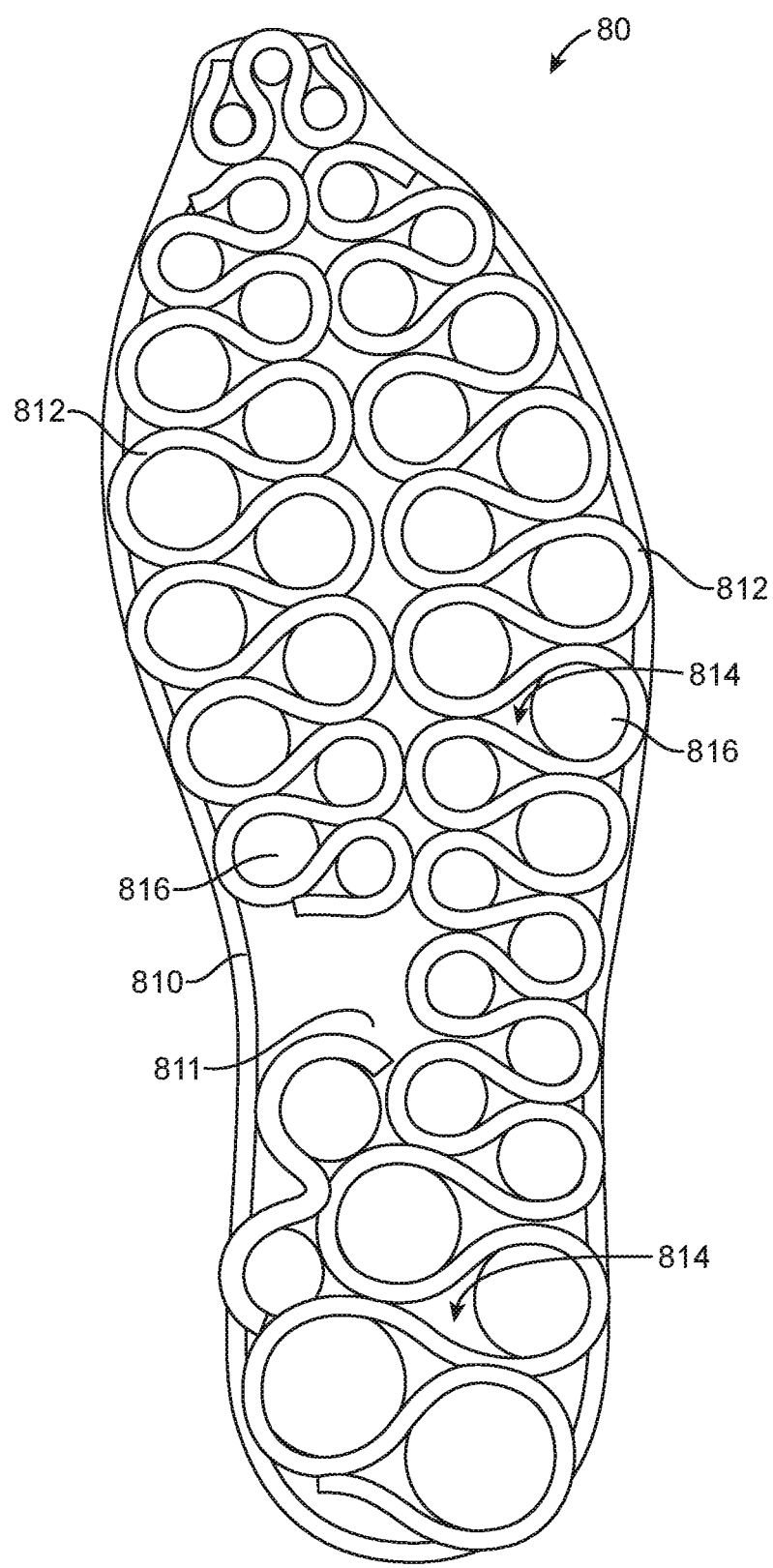
FIG. 16 illustrates a bottom view of a sole for an article of footwear according to an embodiment.

FIG. 16 illustrates a bottom view of a sole 80 for an article of footwear according to an embodiment. In certain embodiments, sole 80 can include a substrate 810 having an exterior surface 811. Substrate 810 can be made from any suitable material, for example, but not limited to, textiles, fabric, synthetic material, foam, rubber, and/or plastic.

In certain embodiments, one or more windings 812 can be disposed on substrate 810. Winding 812 can be any suitable material. In certain embodiments, winding 812 can be a yarn or fabric (e.g., Cordura®). In certain embodiments, winding 812 can be affixed to substrate 810 by an adhesive. In certain embodiments, winding 812 can be an extruded material (e.g., polyurethane elastomer or polyurethane foam). For example, winding 812 can be extruded in patterns as described in U.S. patent application Ser. No. 14/455,650, filed Aug. 8, 2014, which is incorporated by reference herein in its entirety. In certain embodiments, the extruded material can adhere to substrate 810 without any additional adhesive.

In one embodiment winding 812 is a continuous elongate member. Winding 812 can be solid or hollow, such as a tube. Winding 812 can be a single continuous member, or multiple windings 812 can be disposed on substrate 810. In certain embodiments, winding 812 can be disposed in one or more layers. The layers of winding 812 can form wells 814 of various shapes and sizes, which can provide structure and support to sole 80. Certain areas of sole 80 can have deeper wells 814 than other areas. For example, by adding layers of winding 812, a heel region of sole 80 can have deeper wells 814 than a forefoot region.

In certain embodiments, cushioning elements 816 can be disposed within wells 814. Cushioning elements 816 can form a midsole or outsole of sole 80. In certain embodiments, cushioning elements 816 can be extruded into wells 814. Cushioning elements 816 can be the same material as winding 812 or a different material. In certain embodiments, winding 812 and/or cushioning elements 816 can be a non-dispensed material. In certain embodiments, cushioning elements 816 can be a polyester-based or polyether-based polyurethane elastomer or polyurethane foam. In certain embodiments, cushioning elements 816 can be thixotropic such that the material viscosity for cushioning elements 816 is lower when agitated or mixed for ease of extrusion, but will have increased viscosity once extrusion or agitation is complete. In certain embodiments, an additional layer of material can be disposed onto portions of winding 812 and/or cushioning elements 816, for example, an outsole material with sufficient durability to engage a ground surface.

The embodiment shown in FIG. 16 has the benefit of producing sole 80 without a mold. Thus, windings 812 can be customized for a particular wearer and then filled with material for cushioning elements 816, as desired. In certain embodiments, winding 812 and/or cushioning elements 816 can be foam or elastomer. In certain embodiments, winding 812 and/or cushioning elements 816 can be dispensed freeform (i.e., not onto a substrate 810).

Figure 17:
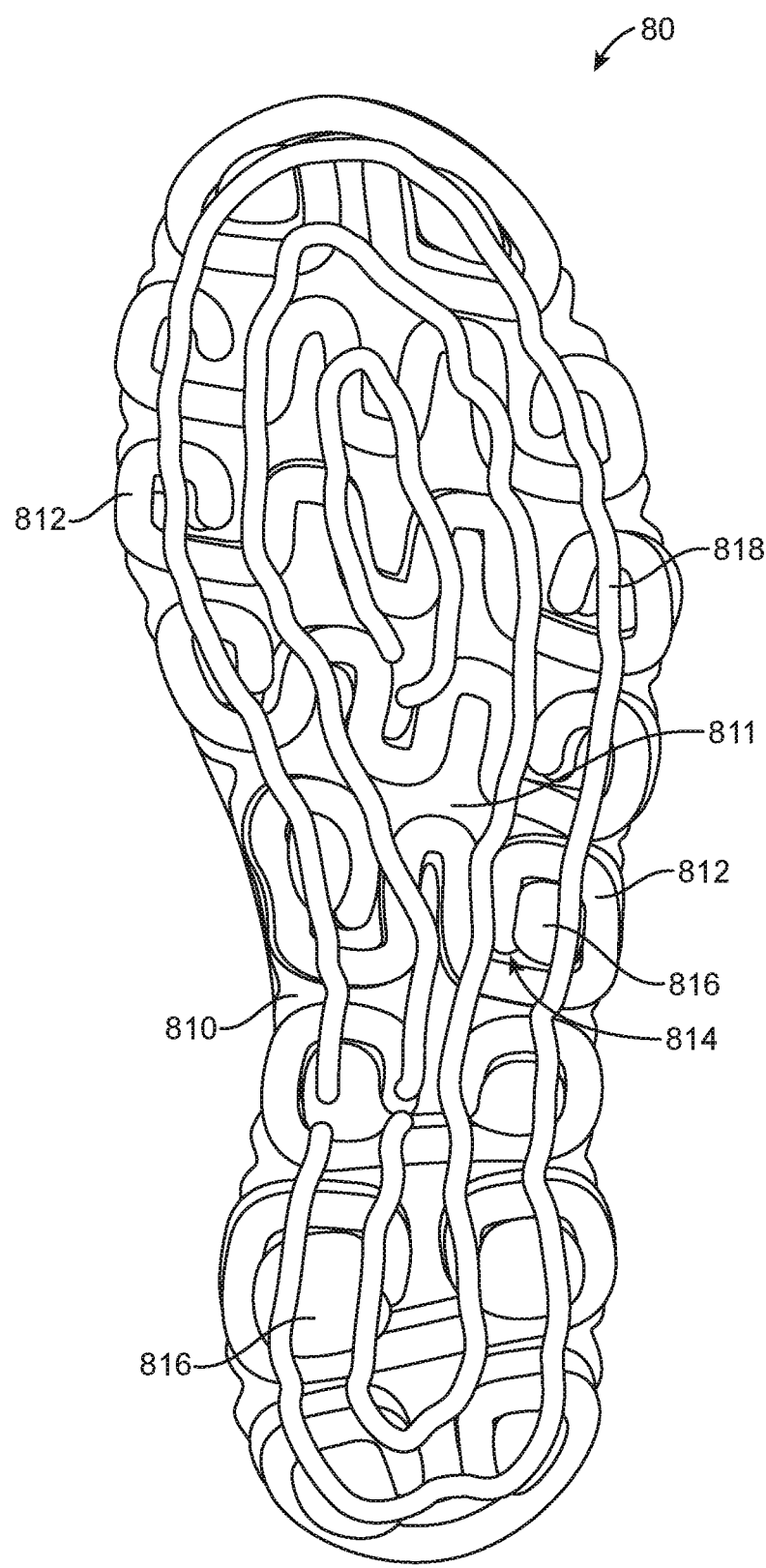
FIG. 17 illustrates a bottom view of a sole for an article of footwear according to an embodiment.
Figure 18:
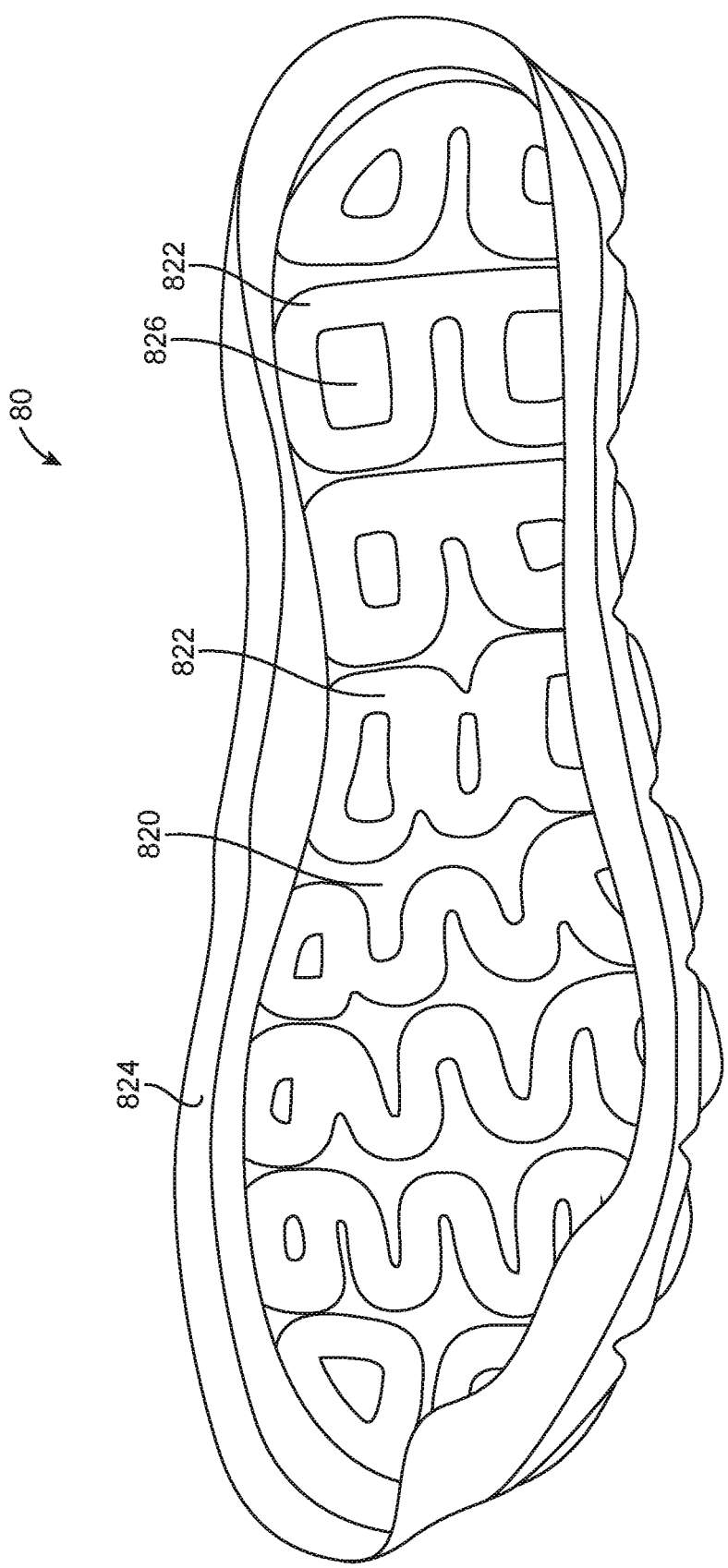
FIG. 18 illustrates a top perspective view of a sole for an article of footwear according to an embodiment.
Figure 19:
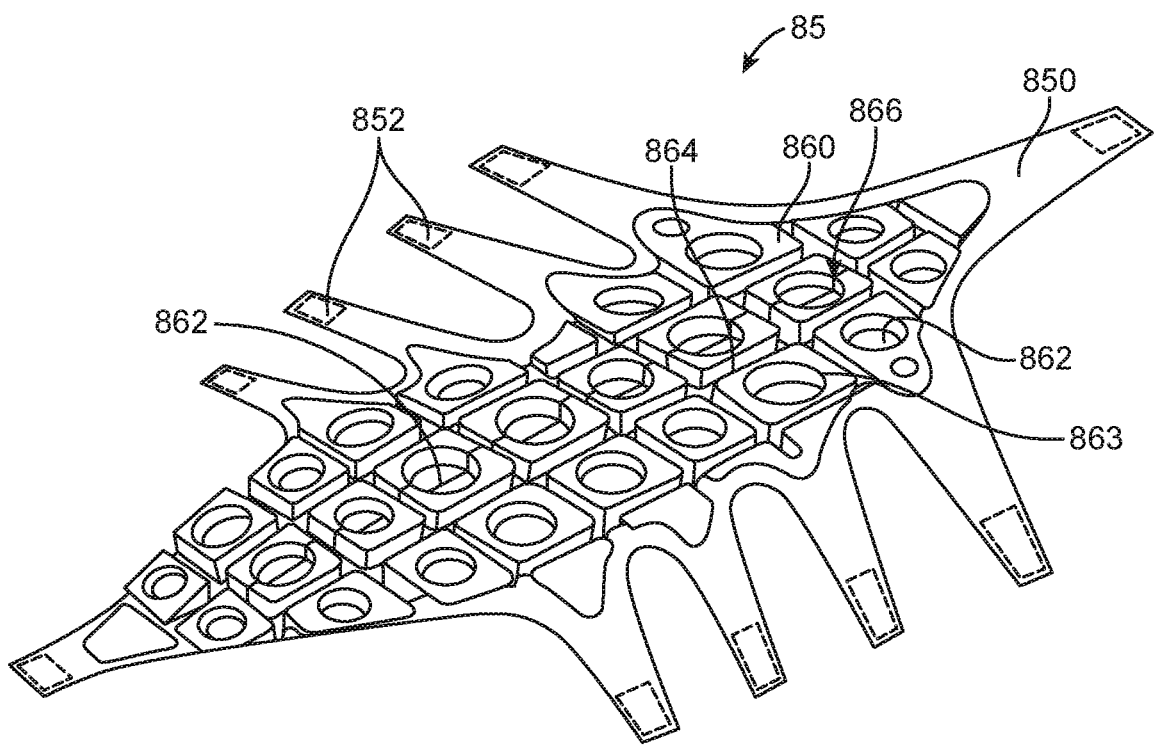
FIG. 19 illustrates a bottom perspective view of a sole for an article of footwear according to an embodiment.
Figure 20:
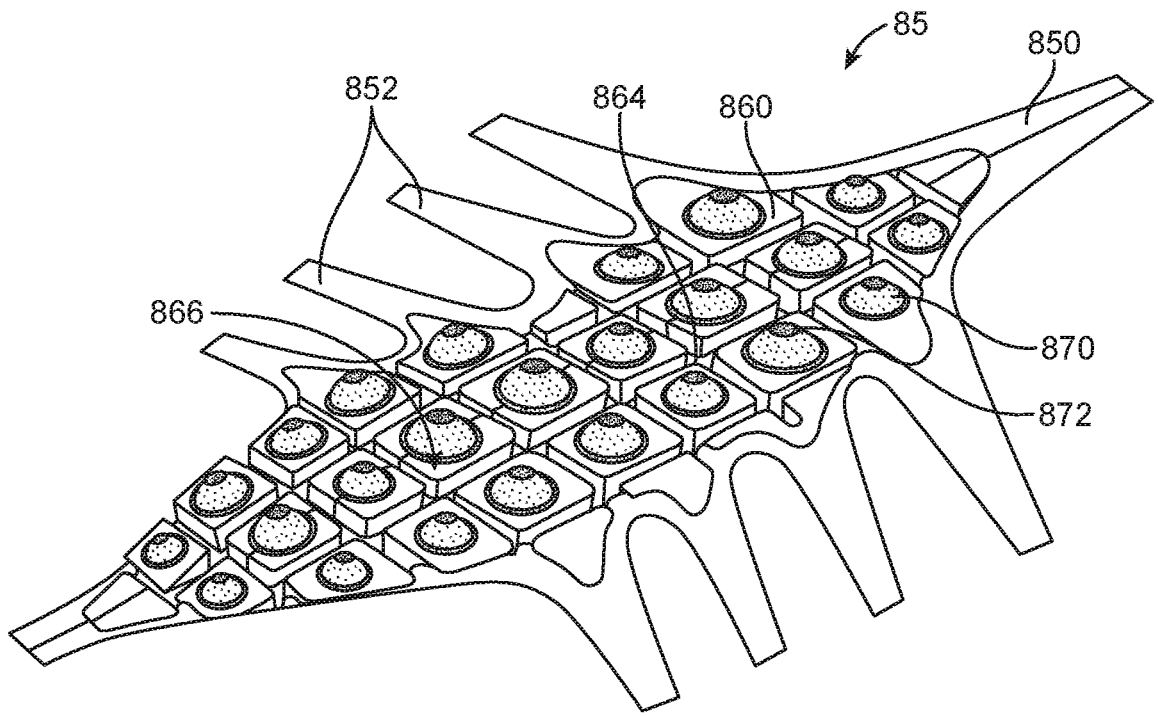
FIG. 20 illustrates a bottom perspective view of a sole for an article of footwear according to an embodiment.

FIGS. 17 and 18 illustrate a sole 80 according to an embodiment. As shown in the bottom view of FIG. 17, one or more winding 812, for example, an extruded member, can be disposed on exterior surface 811 of substrate 810. In certain embodiments, no substrate 810 is used and the winding 812 and/or cushioning elements 816 are extruded onto a plate, a non-stick surface (e.g., polypropylene, Teflon, silicon, or a surface sprayed with a release), or a textile. Layers of windings 812 can form wells 814 within which cushioning elements 816, for example, extruded material, can be disposed. In certain embodiments, an additional layer of material, for example, extruded member 818, can be disposed onto winding 812 and/or cushioning elements 816.

FIG. 18 illustrates a top perspective view of sole 80 according to an embodiment. In certain embodiments, substrate 810 can have a sidewall 824 around a periphery of sole 80. Sidewall 824 can facilitate coupling sole 80 with an upper to form an article of footwear. For example, an adhesive can be applied to sidewall 824 so that it can be affixed to the upper.

In certain embodiments, exterior surface 811 of substrate 810 can have one or more grooves 822. In certain embodiments, windings 812 and/or cushioning elements 816 can be disposed in grooves 822. The grooves 822 can be seen on the interior surface 820 of substrate 810 in FIG. 18 as raised portions (i.e., complement of the grooves 822 in the exterior surface 811). Portions of exterior surface 811 that are not the grooves 822 appear as indentations 826 when viewed on interior surface 820.

FIGS. 19-22 illustrate a sole 85 and an article of footwear including sole 85. In certain embodiments, a tray 860, for example a molded tray, can be disposed on a substrate 850. In certain embodiments, substrate 850 can be a fabric or synthetic material. In certain embodiments, tray 860 can have a plurality of receptacles 862. Receptacles 862 can be formed as cavities in tray 860.

In certain embodiments, tray 860 can have a plurality of channels 864, forming a plurality of cells 866. For example, tray 860 can have channels 864 extending along a length and/or width of sole 85. In certain embodiments, a plurality of cells 866 can include a receptacle 862. As shown in the bottom perspective view of FIG. 20, in certain embodiments, cushioning elements 870 can be disposed in receptacles 862. In certain embodiments, cushioning elements 870 can be formed from an extruded material, for example, polyurethane elastomer and/or polyurethane foam. In certain embodiments, cushioning elements 870 can extend beyond a rim 863 of receptacles 862.

In certain embodiments, a nub 872 can be disposed on one or more receptacles 862. In certain embodiments, a plurality of nubs 872 can act as an outsole for sole 85. In certain embodiments, nub 872 can made from a material with sufficient durability to engage a ground surface. In certain embodiments nub 872 can be an extruded material, for example, rubber, foam, polyurethane elastomer, or polyurethane foam.

Figure 21:
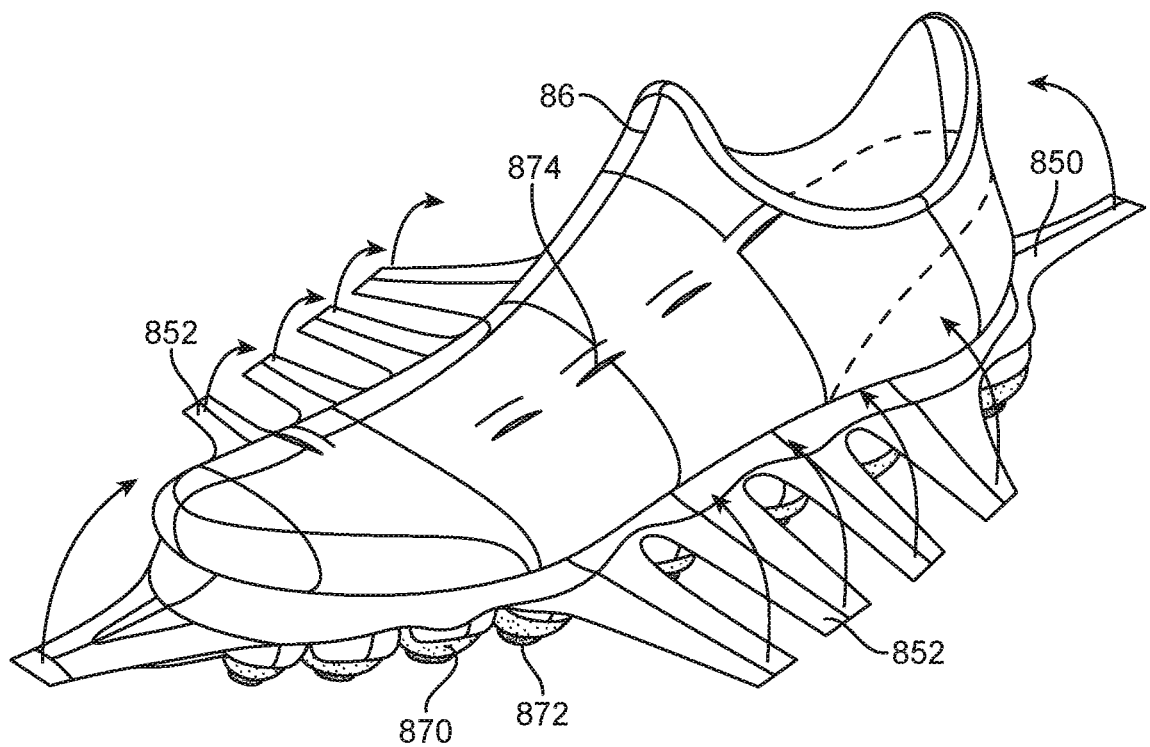
FIG. 21 illustrates an article of footwear according to an embodiment.
Figure 22:
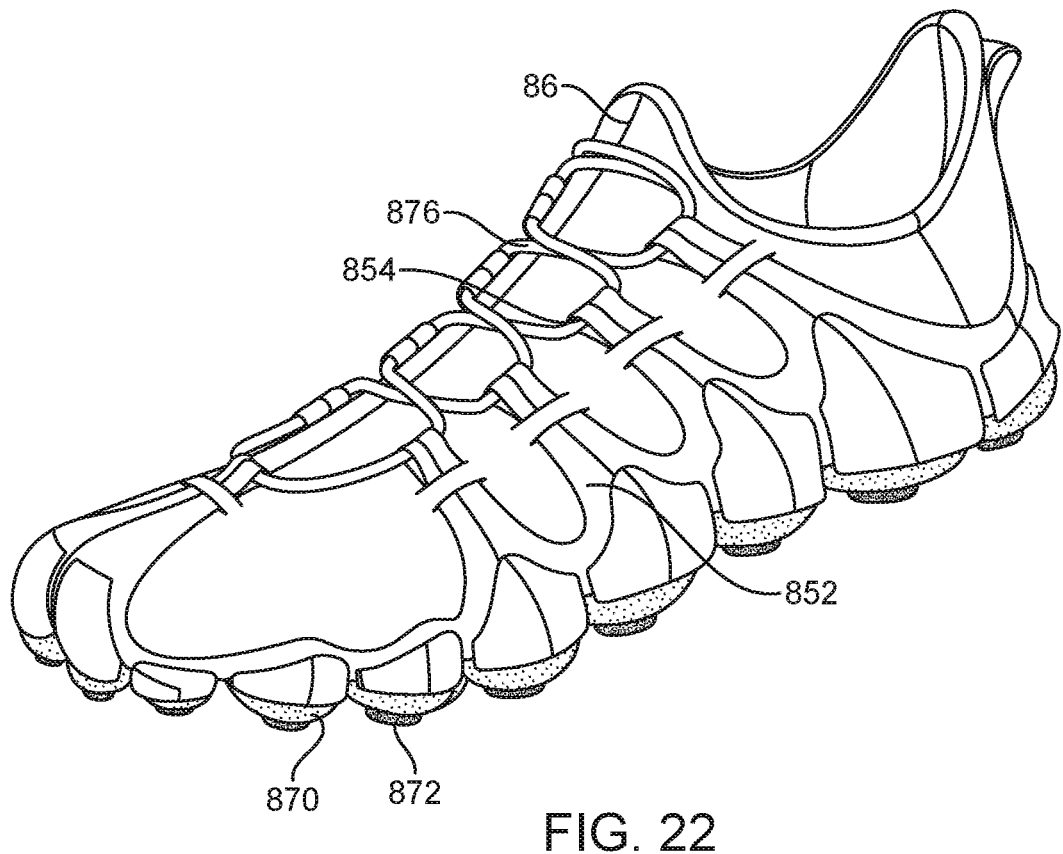
FIG. 22 illustrates an article of footwear according to an embodiment.
Figure 24:
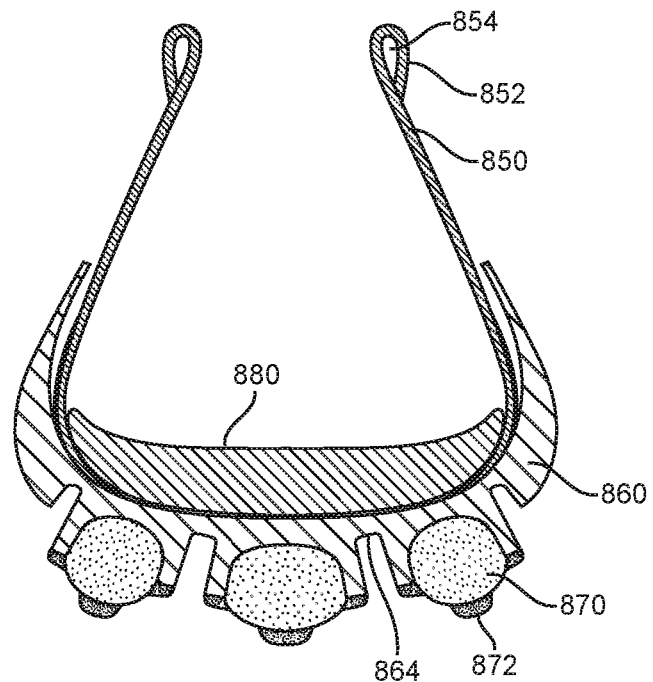
FIG. 24 illustrates a cross-sectional view of an article of footwear according to an embodiment.

As shown in FIGS. 21 and 22, in certain embodiments, sole 85 can be coupled with upper 86. In certain embodiments, upper 86 can be a bootie made of, for example, fabric or foam. A side of substrate 850 opposite tray 860 can contact upper 86. In certain embodiments, an adhesive can be used to couple substrate 850 with upper 86. In certain embodiments, one or more flaps 852 of substrate 850 can facilitate coupling sole 85 with upper 86. For example, flaps 852 can be folded around upper 86. In certain embodiments, flap 852 can be passed through slit 874 in upper 86. In certain embodiments, flap 852 can be folded over and attached to itself to form loop 854 through which lace 876 can be threaded. The cross-sectional view in FIG. 24 illustrates a cross-sectional view of an article of footwear according to an embodiment that includes sole 85. The folded loops 854 of flaps 852 are shown. FIG. 24 also illustrates a sock liner 880, which can be disposed within an interior of the article of footwear between the wearer's foot and sole 85.

Figure 23A:
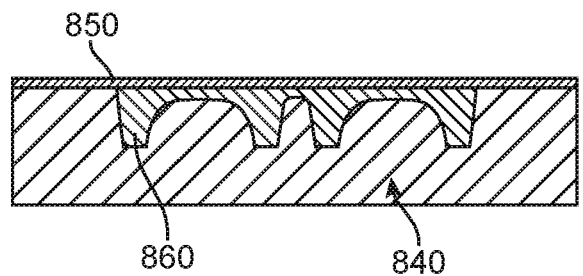
FIG. 23A illustrates a cross-sectional view of a mold for a sole for an article of footwear according to an embodiment.
Figure 23B:
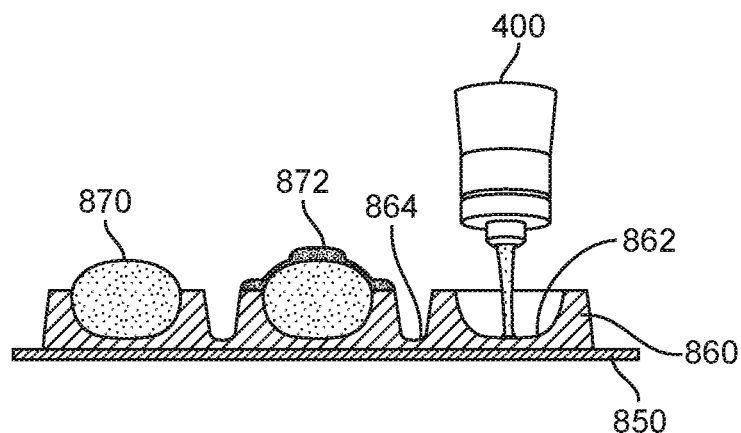
FIG. 23B illustrates a cross-sectional view of a sole for an article of footwear according to an embodiment.

FIG. 23A illustrates a cross-sectional view of a mold 840 that can be used to form sole 85 in an embodiment. For example, a material for tray 860 can be dispensed into mold 840 and substrate 850 can be disposed thereupon. In certain embodiments, heat and/or compression can be applied so that tray 860 adheres to substrate 850. Then, as shown in the cross-sectional view of FIG. 23B, in an embodiment, an extruder 400 can extrude cushioning elements 870 and/or nubs 872 into the receptacles 862 of tray 860.

In an embodiment, substrate 850 can be placed over the receptacles 862 of tray 860 and pressed into the concavities of the receptacles 862 to form a liner. Material for cushioning element 870, for example, foam, can then be extruded into the receptacles 862. As the material cross-links, it can expand, securing the substrate 850 within the receptacles 862 such that substrate 850 is disposed between the tray 860 and cushioning elements 870.

Figure 25:
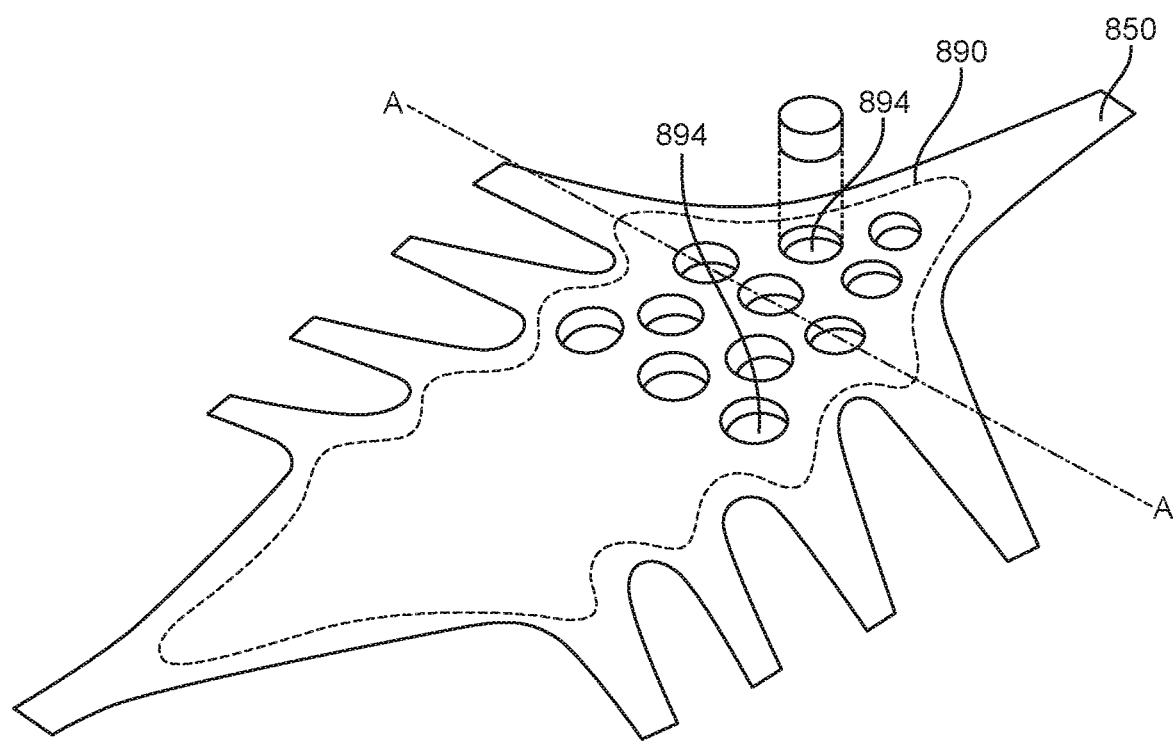
FIG. 25 illustrates a bottom perspective view of a sole for an article of footwear according to an embodiment.
Figure 26:
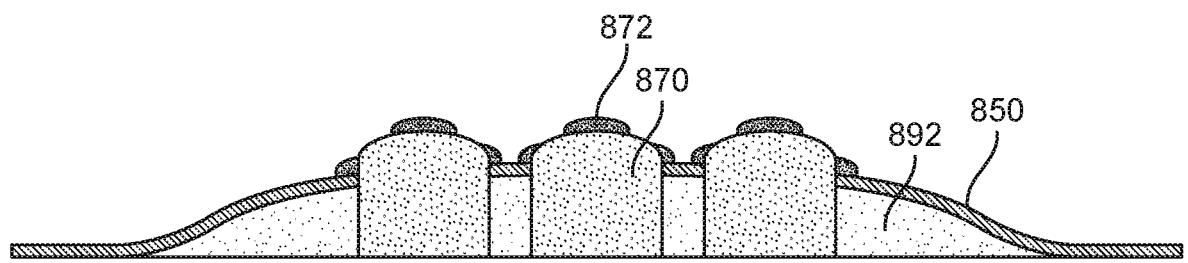
FIG. 26 illustrates a cross-sectional view of a sole for an article of footwear according to an embodiment.

FIG. 25 illustrates a sole according to an embodiment. FIG. 26 illustrates a cross-section along line A-A in FIG. 25. In certain embodiments, a tray 890 can have a cavity into which a filler 892, for example, a foam, is dispensed. In certain embodiments, the tray 890 and filler 892 can be covered by substrate 850. In certain embodiments, cutouts 894 can be made through the substrate 850 and filler 892, for example, by laser or die cutting. Cushioning elements 870 can be extruded into cutouts 894. A benefit of this embodiment is that air pockets in the filler 892 can facilitate adhesion of the extruded cushioning elements 870 with the filler 892 as the extruded material expands into the air pockets.

Figure 27:
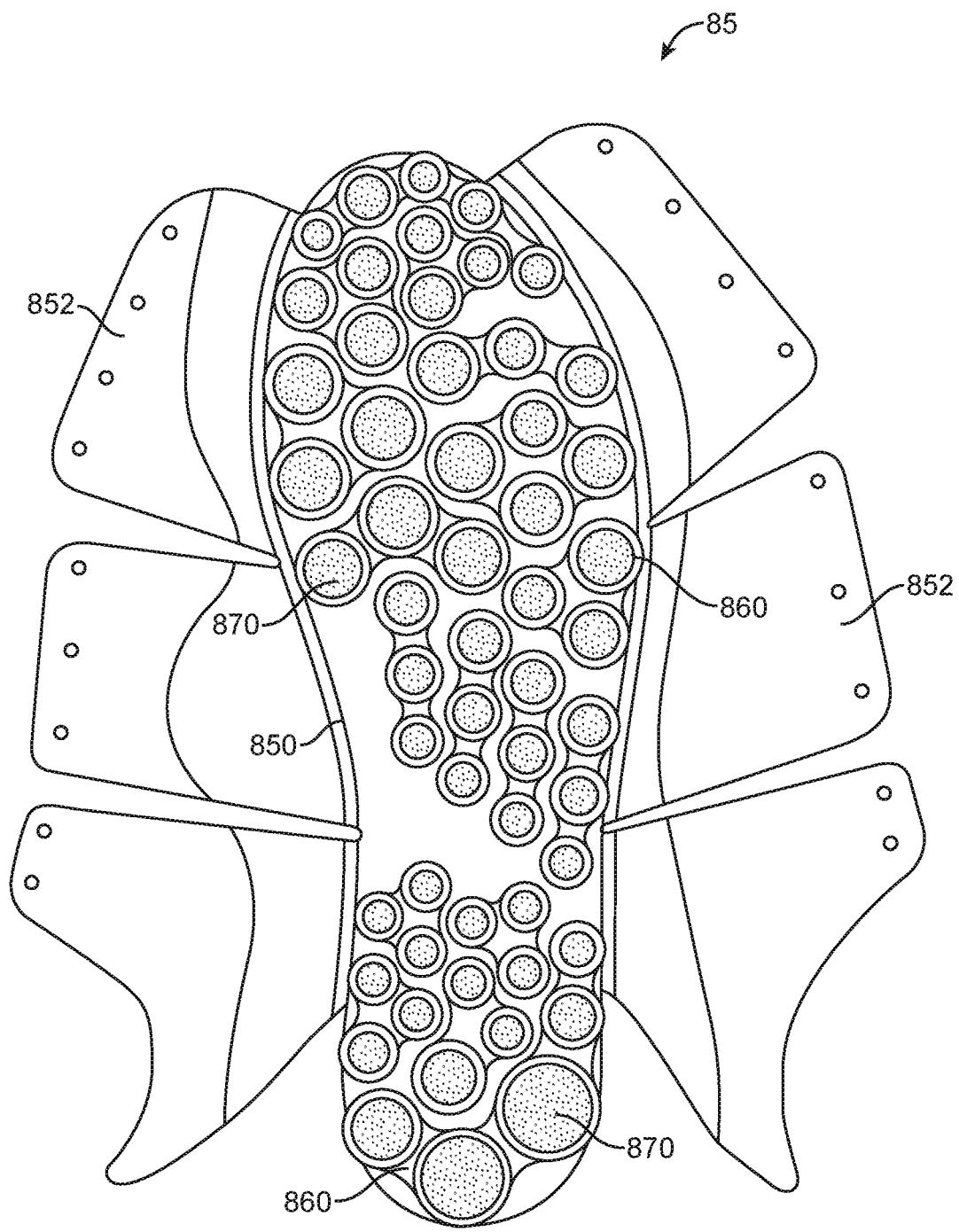
FIG. 27 illustrates a bottom view of an article of footwear according to an embodiment.

FIG. 27 illustrates a bottom view of an article of footwear, including a sole 85, according to an embodiment. In certain embodiments, flaps 852 can form the upper for the article of footwear, for example, in a minimalist shoe. Flaps 852 can wrap around the wearer's foot and have holes through which laces can be threaded to tie the shoe together.

In certain embodiments, a plurality of molded trays 860 can be disposed on substrate 850 of sole 85. Molded trays 860 can include clusters of receptacles 862 of various shapes and sizes, for example, in a row or a triangular pattern. Other configurations for molded trays 860 are contemplated, including molded trays 860 with a single receptacle 862.

Figure 28A:
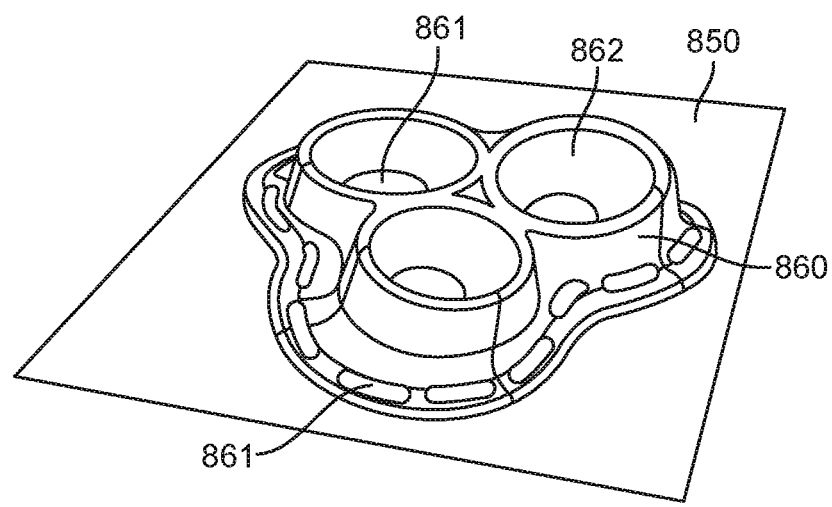
FIGS. 28A-B illustrate a portion of a sole for an article of footwear according to an embodiment.
Figure 28B:
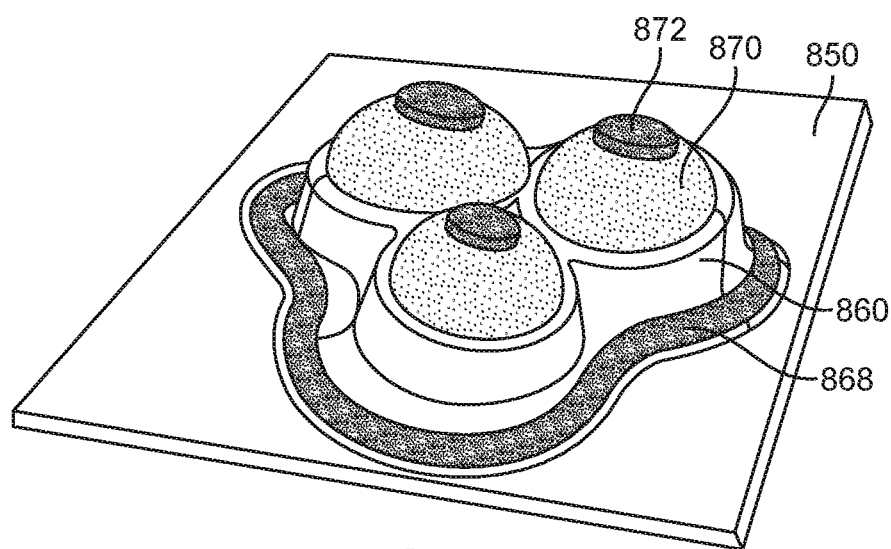
Figure 29:
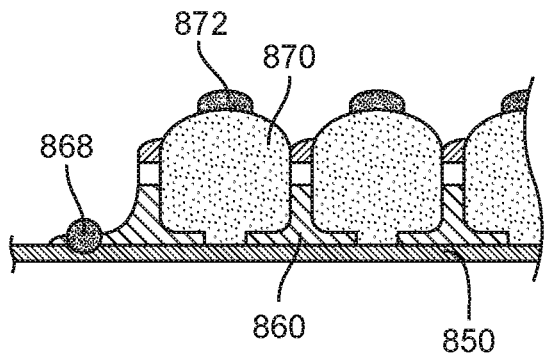
FIG. 29 illustrates a cross-sectional view of a sole for an article of footwear according to an embodiment.

An embodiment of a molded tray 860 is illustrated in FIGS. 28A-B, with a cross-sectional view shown in FIG. 29. In certain embodiments, molded tray 860 can have a plurality of receptacles 862 within which cushioning elements 870 can be disposed. In certain embodiments, molded tray 860 can have a plurality of holes 861. In certain embodiments, a weld row 868 can be disposed (e.g., extruded) along a periphery of molded tray 860 to couple molded tray 860 with substrate 850. Holes 861 through receptacles 862 can also facilitate coupling molded tray 860 with substrate 850 when then cushioning elements 870 are extruded into molded tray 860.

Figure 30:
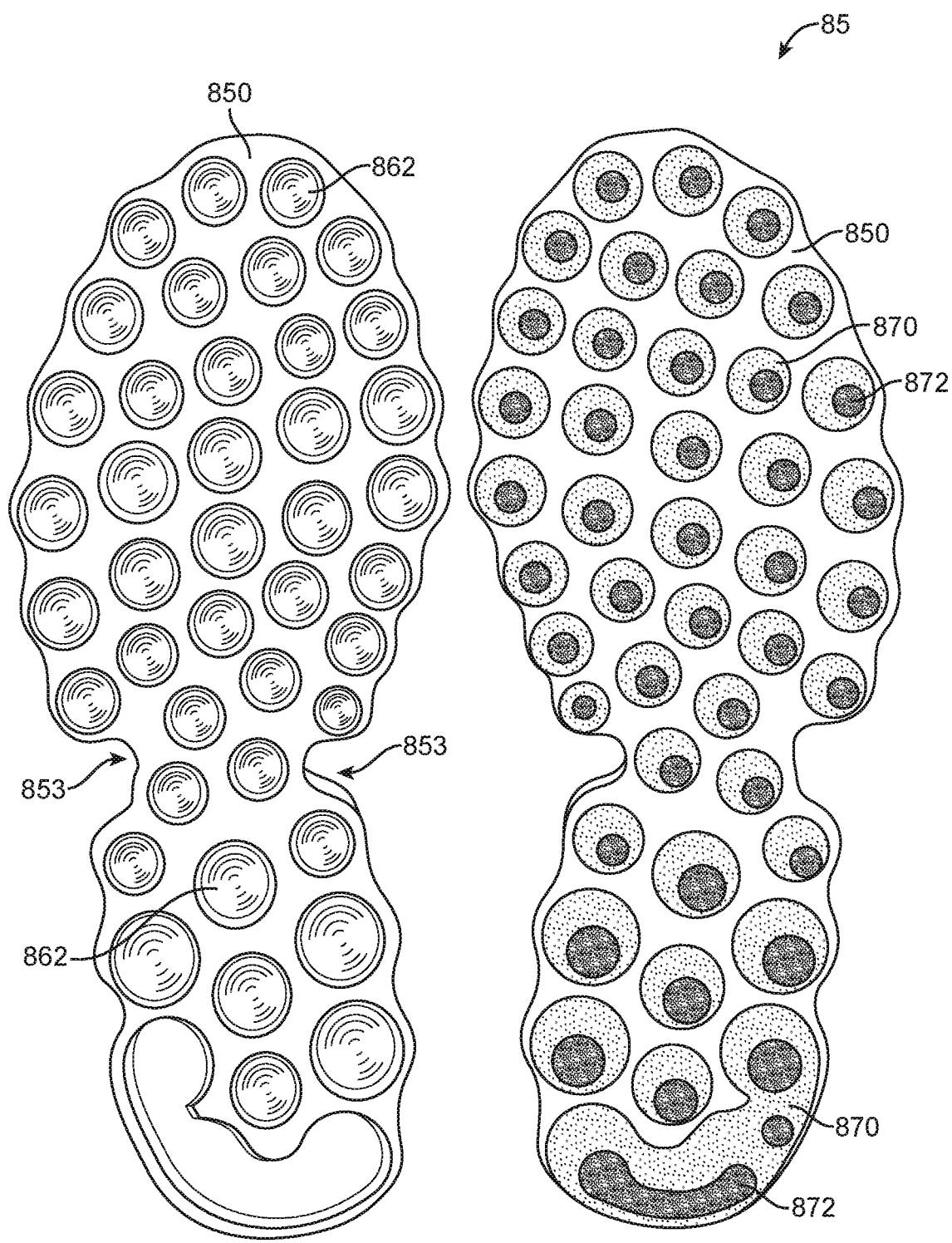
FIG. 30 illustrates a sole for an article of footwear according to an embodiment.
Figure 31:
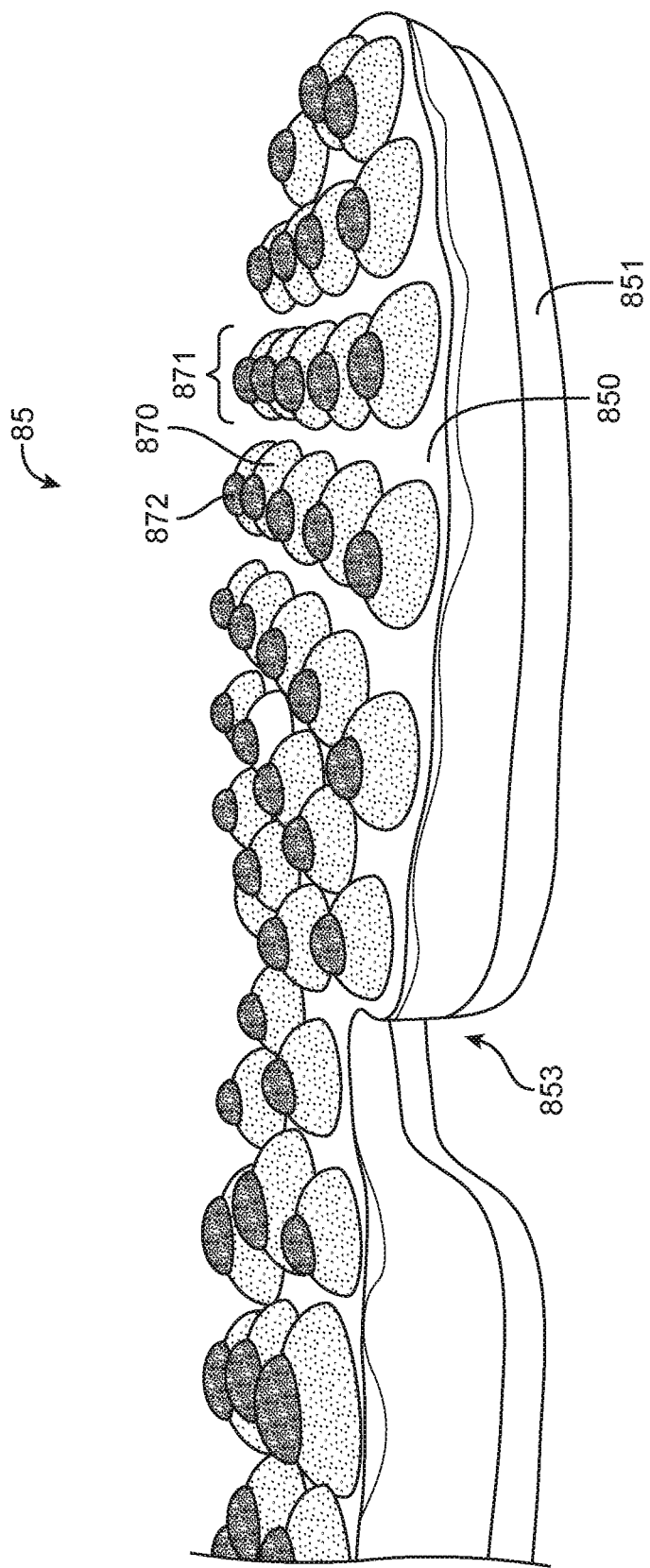
FIG. 31 illustrates a side perspective view of a sole for an article of footwear according to an embodiment.
Figure 32:
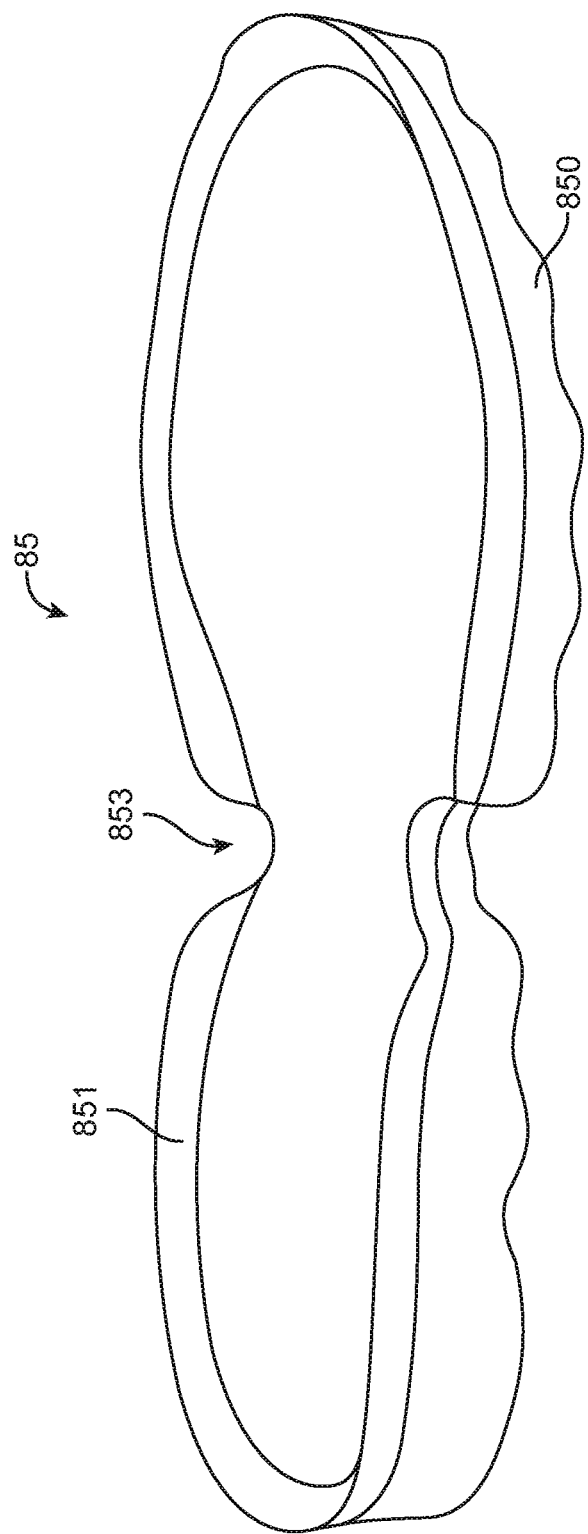
FIG. 32 illustrates a top perspective view of a sole for an article of footwear according to an embodiment.

FIGS. 30-32 illustrate a sole 85 for an article of footwear according to an embodiment. In certain embodiments, substrate 850 can be, for example, a molded foam material having a plurality of receptacles 862 formed therein. Receptacles 862 can be various shapes and sizes. In certain embodiments, substrate 850 can have notches 853 on medial and/or lateral sides, for example, in a midfoot region.

In certain embodiments, cushioning elements 870, for example extruded material, can be disposed in receptacles 862. In certain embodiments, nubs 872 can be disposed on cushioning elements 870. In certain embodiments, receptacles 862 with cushioning elements 870 can be disposed in rows 871. In certain embodiments, the material for cushioning elements 870 can have a different density than the material for substrate 850. In certain embodiments, the extruded viscosity of cushioning element 870 can be high to control the flow of the material.

Figure 33A:
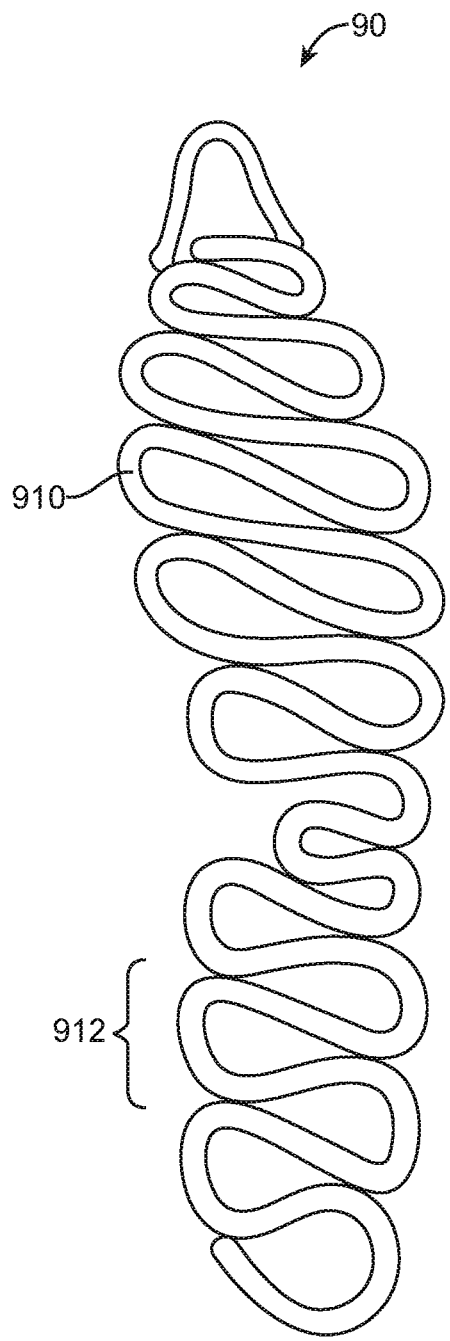
FIGS. 33A-B illustrate a sole for an article of footwear according to an embodiment.
Figure 33B:
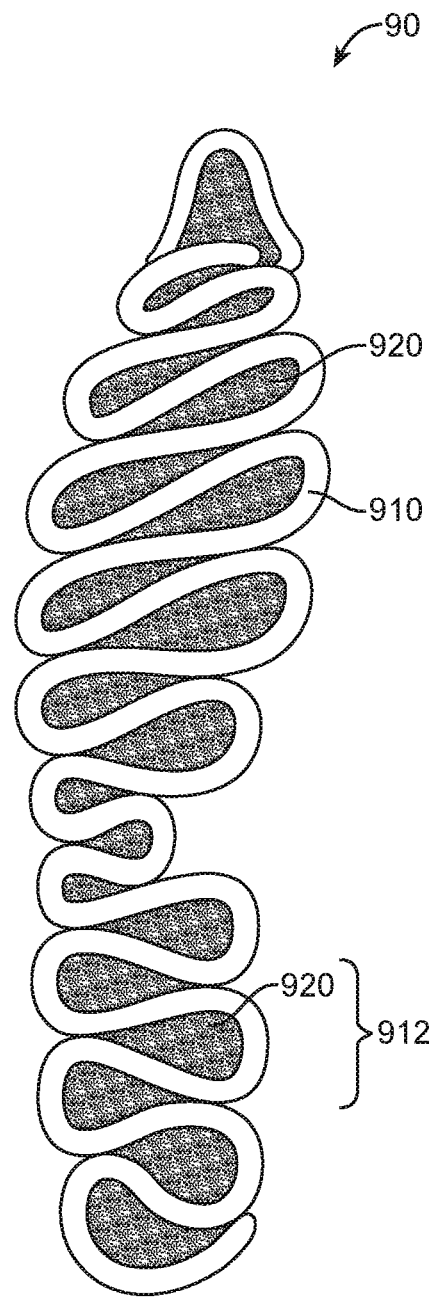
Figure 34:
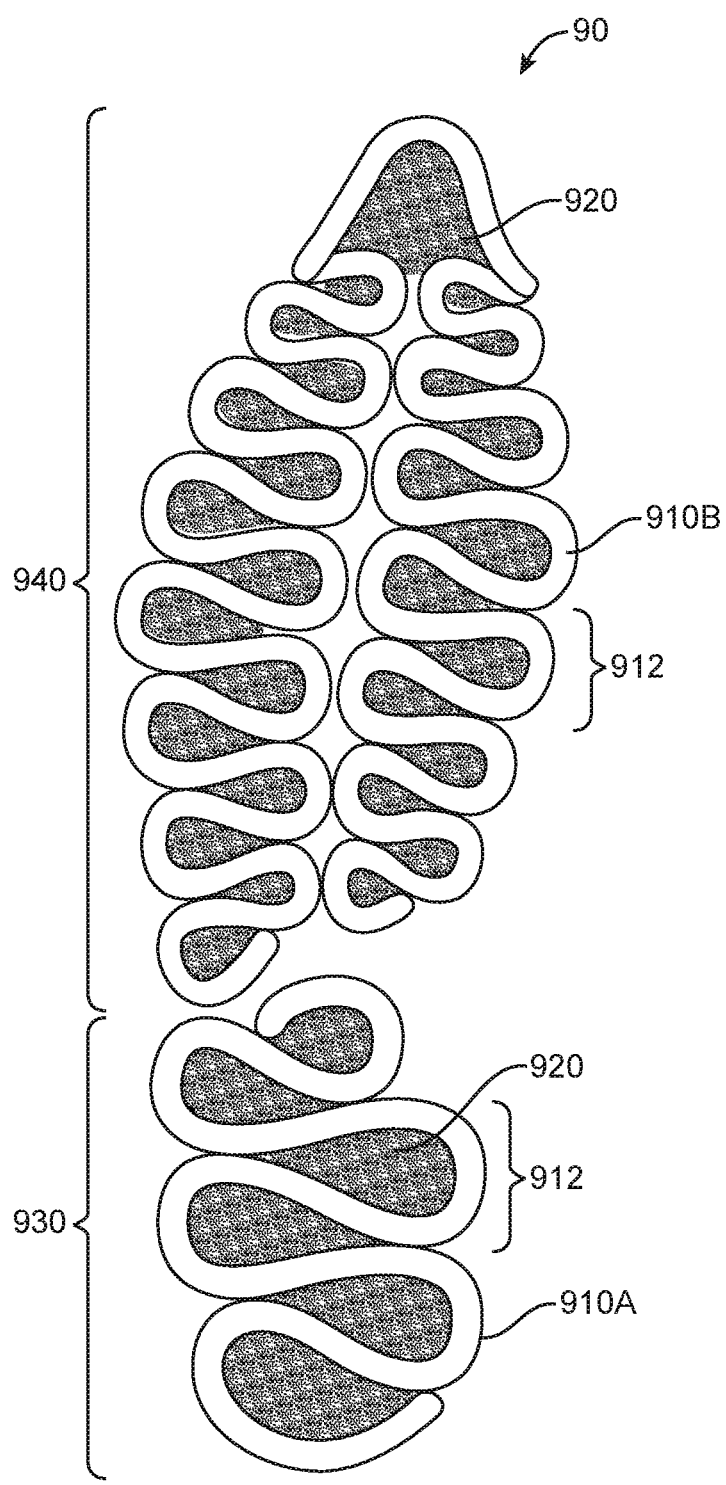
FIG. 34 illustrates a sole for an article of footwear according to an embodiment.

FIGS. 33A-B and 34 illustrate soles 90 for an article of footwear according to embodiments. In certain embodiments, sole 90 can be extruded onto a substrate, for example, textiles or synthetic materials, as described herein. In certain embodiments, sole 90 can be extruded onto a plate, a non-stick surface, or a textile, and upon curing, removed from the plate, non-stick surface, or textile without being disposed onto a substrate. FIG. 33A illustrates an embodiment of frame 910 for sole 90. In certain embodiments, frame 910 can be an extruded member, for example, as described in U.S. patent application Ser. No. 14/455,650, filed Aug. 8, 2014, which is incorporated by reference herein in its entirety. In certain embodiments, frame 910 can be a polyurethane elastomer or a polyurethane foam. Frame 910 can be a single continuous member (e.g., FIG. 33A) or include multiple members (e.g., FIG. 34). For example, sole 90 can have a frame 910A for a heel region 930 and a frame 910B for a forefoot region 940. In certain embodiments, medial and lateral sides of frame 910 can be spaced from each other along an interior portion of sole 90 (e.g., FIG. 34). In certain embodiments there can be a gap in a midfoot region between heel region 930 and forefoot region 940. In certain embodiments, frame 910 can include multiple layers of extruded members.

In certain embodiments, frame 910 can have a plurality of loops 912. Loops 912 can be formed in various shapes and sizes. For example, in certain embodiments, at least one loop 912 in heel region 930 can be larger than a loop 912 in forefoot region 940. In certain embodiments, adjacent loops 912 can contact each other such that the loops 912 form an enclosed area. As shown, for example, in FIGS. 33B and 34, in certain embodiments, loops 912 can be filled with cushioning elements 920, for example, extruded material. In certain embodiments, cushioning elements 920 can be a polyurethane elastomer or a polyurethane foam. Frame 910 and/or cushioning elements 920 can be made from other materials, including but not limited to rubber and foam. Frame 910 and cushioning elements 920 can be made from the same material or different materials. The enclosed loops 912 can limit the spreading of the material for cushioning elements 920 as the material is extruded into loops 912. Upon curing, cushioning elements 920 can adhere to loops 912 of frame 910.

Figure 35:
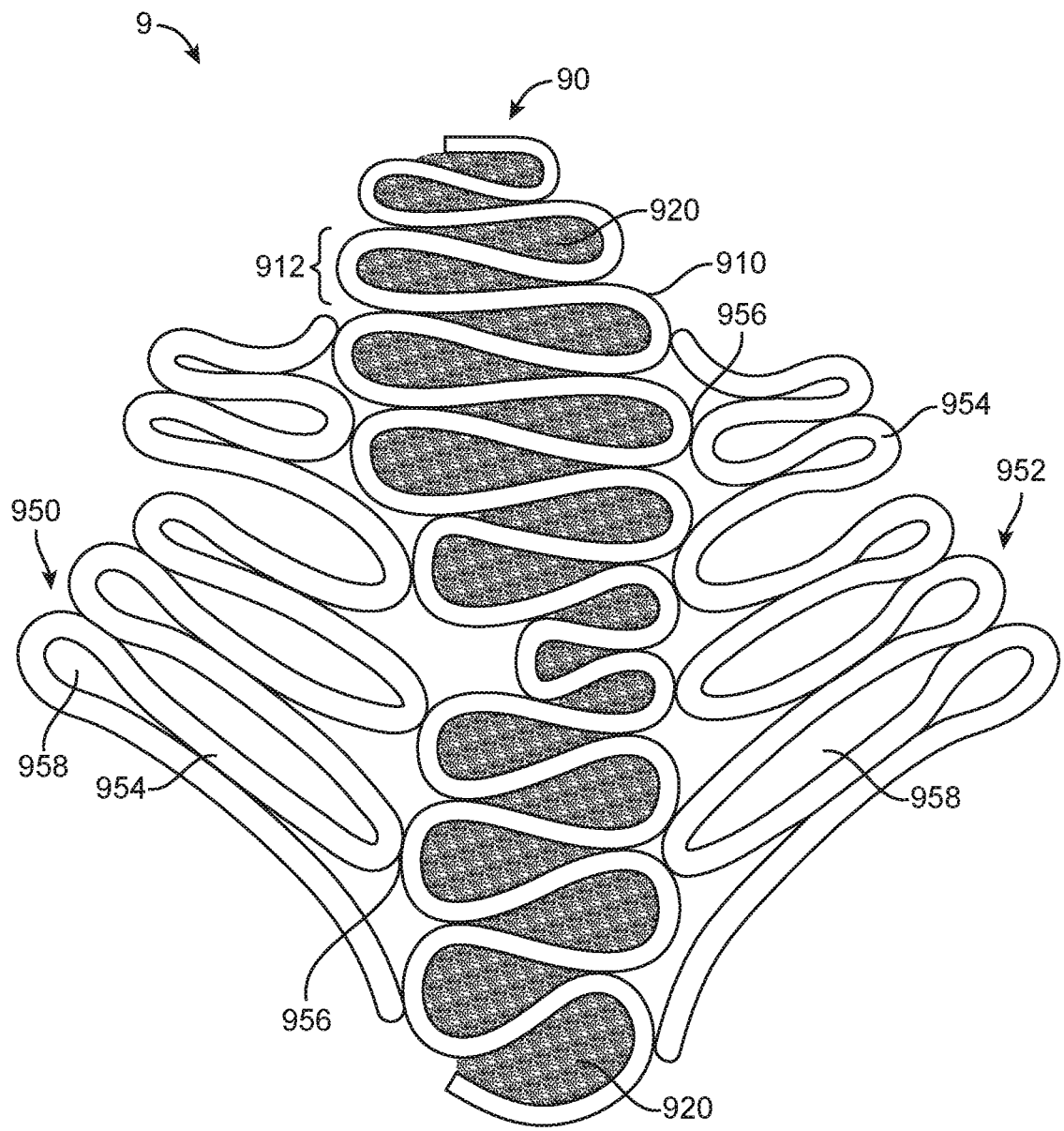
FIG. 35 illustrates an article of footwear according to an embodiment.

FIGS. 35 and 37A-B illustrate articles of footwear 9, according to embodiments. Article of footwear 9 can have features similar to other embodiments described herein, for example, as shown in FIGS. 33A-B and 34 and described above. For example, article of footwear 9 can be dispensed or extruded onto a substrate, for example, textiles or synthetic materials, as described herein. In certain embodiments, sole 90 can be extruded onto a plate, a non-stick surface, or a textile, and upon curing, removed from the plate, non-stick surface, or textile without being disposed onto a substrate. FIGS. 35 and 37A-B illustrate embodiments of article of footwear 9 having a sole 90 including frame 910. In certain embodiments, frame 910 can be an extruded member, as described herein. In certain embodiments, frame 910 can be a polyurethane elastomer or a polyurethane foam. Frame 910 can be a single continuous member or can include multiple members. In certain embodiments, frame 910 can include multiple layers of extruded members.

In certain embodiments, frame 910 can have a plurality of loops 912. Loops 912 can be formed in various shapes and sizes. For example, in certain embodiments, at least one loop 912 in a heel region can be larger than a loop in a forefoot region. In certain embodiments, adjacent loops 912 can contact each other such that the loops 912 form an enclosed area. In certain embodiments, loops 912 can be filled with cushioning elements 920, for example, extruded material. FIG. 37B illustrates sole 90 with cushioning elements 920 and FIG. 37A illustrates sole 90 prior to dispensing cushioning elements 920 into loops 912, according to an embodiment. In certain embodiments, cushioning elements 920 can be a polyurethane elastomer or a polyurethane foam. Frame 910 and/or cushioning elements 920 can be made from other materials, including but not limited to rubber and foam. Frame 910 and cushioning elements 920 can be made from the same material or different materials. The enclosed loops 912 can limit the spreading of the material for cushioning elements 920 as the material is extruded into loops 912. Upon curing, cushioning elements 920 can adhere to loops 912 of frame 910.

FIGS. 35 and 37A-B also illustrate embodiments of articles of footwear 9 that include medial wing 950 and lateral wing 952. In certain embodiments, medial wing 950 and lateral wing 952 can be elongate members 954, for example, extruded members. In certain embodiments, medial wing 950 and lateral wing 952 can be a single, continuous extruded member. In certain embodiments, medial wing 950 and lateral wing 952 can be continuously extruded with frame 910 of sole 90. In certain embodiments, elongated members 954 of medial wing 950 and lateral wing 952 can have generally flat interior and/or exterior surfaces.

Medial wing 950 and lateral wing 952 can be the same material or a different material than frame 910 of sole 90. In certain embodiments, medial wing 950 and lateral wing 952 can form a plurality of loops 958. In certain embodiments, one or more materials can be dispensed into spaces formed by loops 958 to provide additional structure to medial wing 950 and lateral wing 952.

In certain embodiments, medial wing 950 and lateral wing 952 can be coupled to sole 90 at one or more attachment point 956. In certain embodiments, an adhesive or mechanical method can be used to attach medial wing 950 and lateral wing 952 with sole 90. In certain embodiments, medial wing 950 and lateral wing 952 can attach to sole 90, for example, as the extruded material cools or cross-links from a liquid-like form into a solid and adheres to sole 90, for example, to frame 910.

Figure 36:
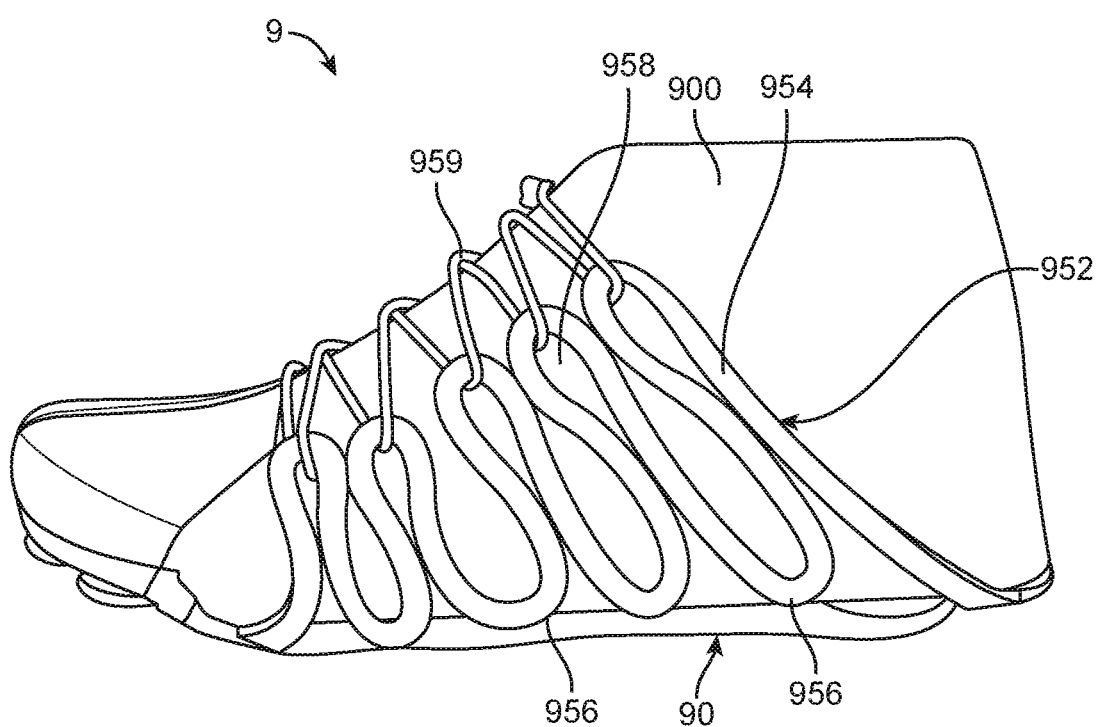
FIG. 36 illustrates an article of footwear according to an embodiment.

FIG. 36 illustrates article of footwear 9 disposed on a last 900, according to an embodiment. During manufacture, the frame 910, medial wing 950, and/or lateral wing 952 may be subjected to heat and pressure while the frame 910 is disposed on the last 900. In certain embodiments, medial wing 950 and lateral wing 952 can be folded such that they are disposed as medial and lateral sides of article of footwear 9. For example, the free ends of medial wing 950 and lateral wing 952 not attached to sole 90 can be folded toward each other. As such, in certain embodiments, medial wing 950 and lateral wing 952 can form portions of an upper of article of footwear 9. In certain embodiments, medial wing 950 and lateral wing 952 can be disposed on or coupled to an upper of the article of footwear 9, made from, for example, fabric, mesh, or leather. Medial wing 950 and lateral wing 952 can be disposed over or under the material for the upper. For example, article of footwear 9 can have a material for an upper disposed between medial wing 950 and lateral wing 952 and last 900. In certain embodiments, one or more lace 959 can couple medial wing 950 with lateral wing 952. For example, a lace 959 can be disposed through one or more loops 958 of medial wing 950 and/or lateral wing 952, such that the loops 958 can act as eyelets for the lace 959.

Figure 38:
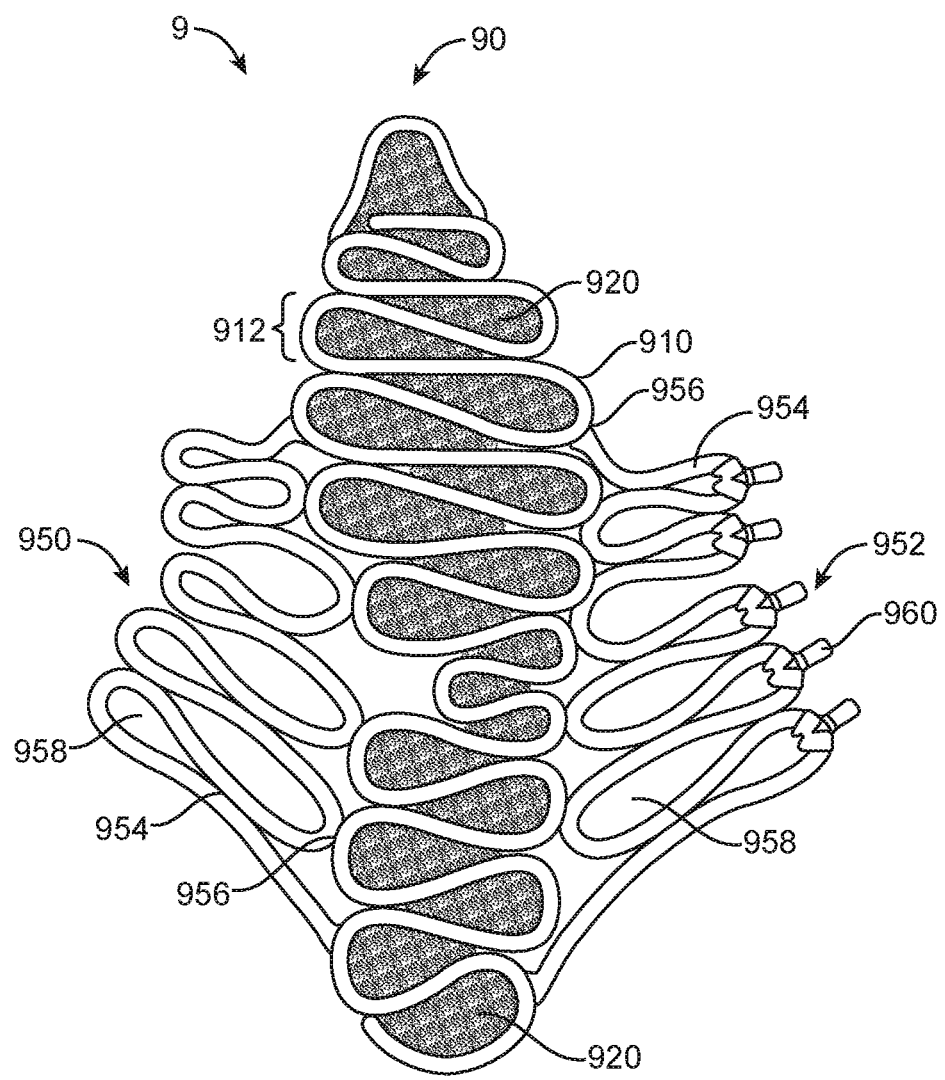
FIG. 38 illustrates an article of footwear according to an embodiment.
Figure 39:
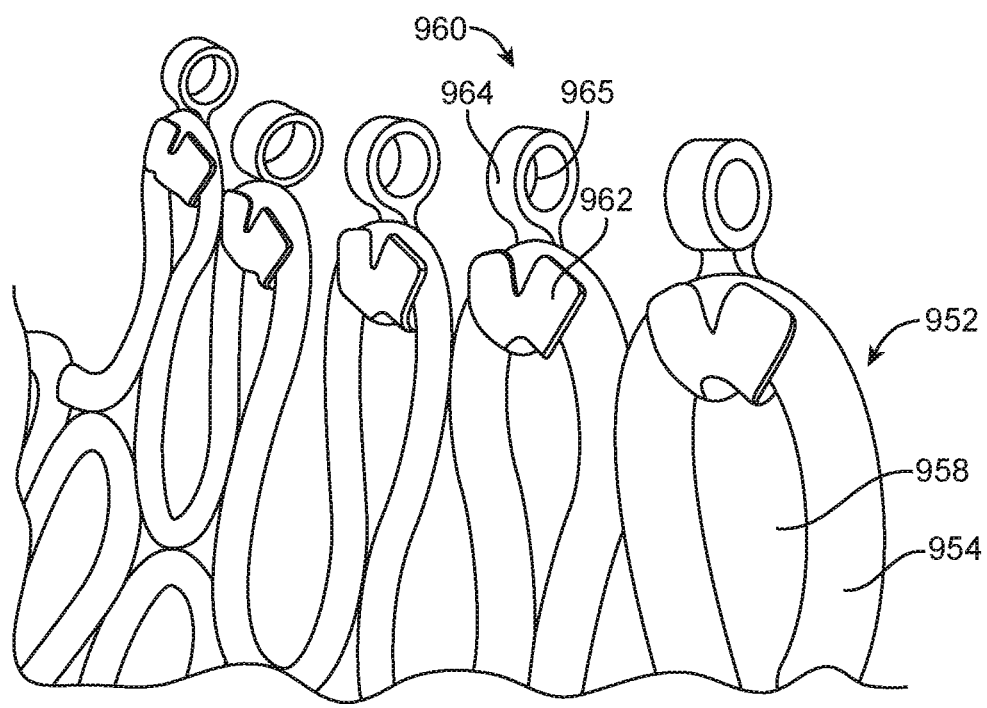
FIG. 39 illustrates a perspective view of an article of footwear according to an embodiment.
Figure 40:
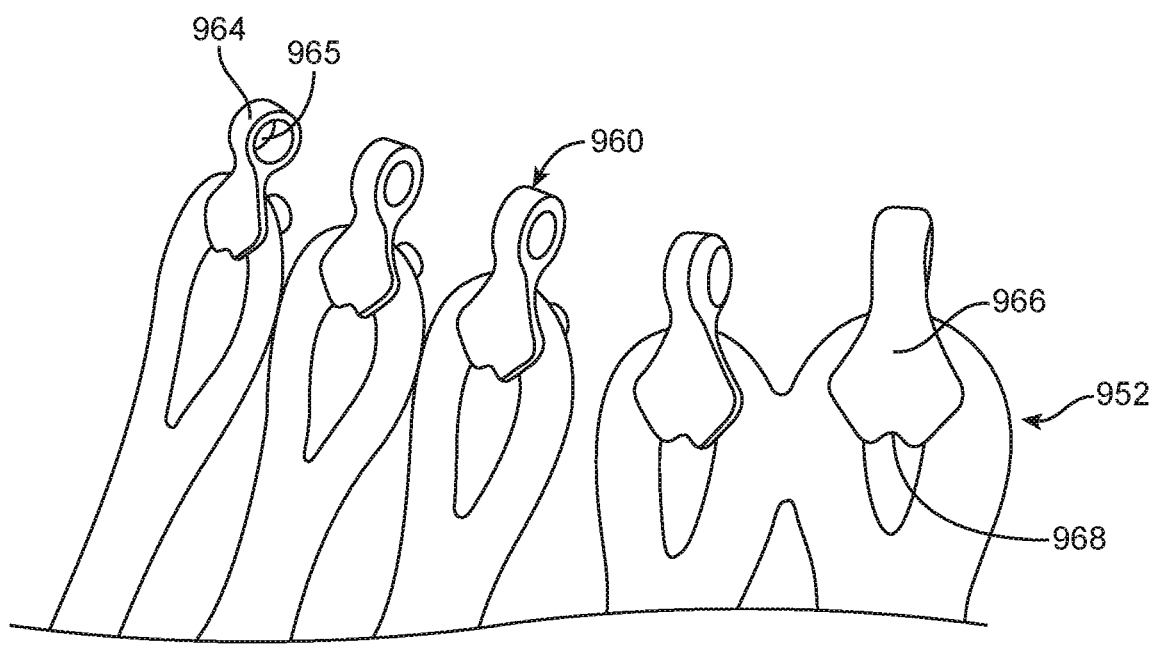
FIG. 40 illustrates a perspective view of an article of footwear according to an embodiment.

FIG. 38 illustrates an article of footwear 9 according to an embodiment. Article of footwear 9 can include the same or similar components as shown, for example, in FIG. 37B. In certain embodiments, article of footwear 9 can include medial wing 950 and lateral wing 952. FIG. 38 also illustrates lace attachments 960 according to an embodiment. FIGS. 39 and 40 illustrate an interior side and exterior side, respectively, of lateral wing 952 with lace attachments 960, according to an embodiment.

In certain embodiments, one or more lace attachments 960 can be coupled to medial wing 950 and/or lateral wing 952. Lace attachments 960 can be configured to receive a lace 959 to secure article of footwear 9 to a wearer's foot. Lace attachments 960 can be made from, for example, metal, plastic, polyurethane elastomer, polyurethane foam, or any other suitable material. In certain embodiments, lace attachment 960 can be coupled to an elongate member 954, for example, to a distal end of loop 958. In certain embodiments, one or more hook 962 can be disposed around loop 958 to couple lace attachment 960 with loop 958. In certain embodiments, lace attachment 960 can have an exterior flat surface 966, as shown, for example, in FIG. 40. In certain embodiments, lace attachment 960 can include notch 968. In certain embodiments, lace attachment 960 can be switched such that flat surface 966 is disposed on the interior side of loop 958 and hooks 962 are disposed on the exterior side of loop 958. In certain embodiments, lace attachment 960 can have a head portion 964 configured to receive a lace 959. In certain embodiments, head portion 964 can have an eyelet 965 through which the lace 959 can pass. By disposing lace attachments 960 on both medial wing 950 and lateral wing 952, lace 959 can be threaded, for example, through eyelets 965, to secure article of footwear 9 to the wearer's foot. In one embodiment, lace attachments 960 may be removably coupled to an elongate member 954 such that attachments may be replaced or changed (e.g., to a desired shape or color).

Figure 41:
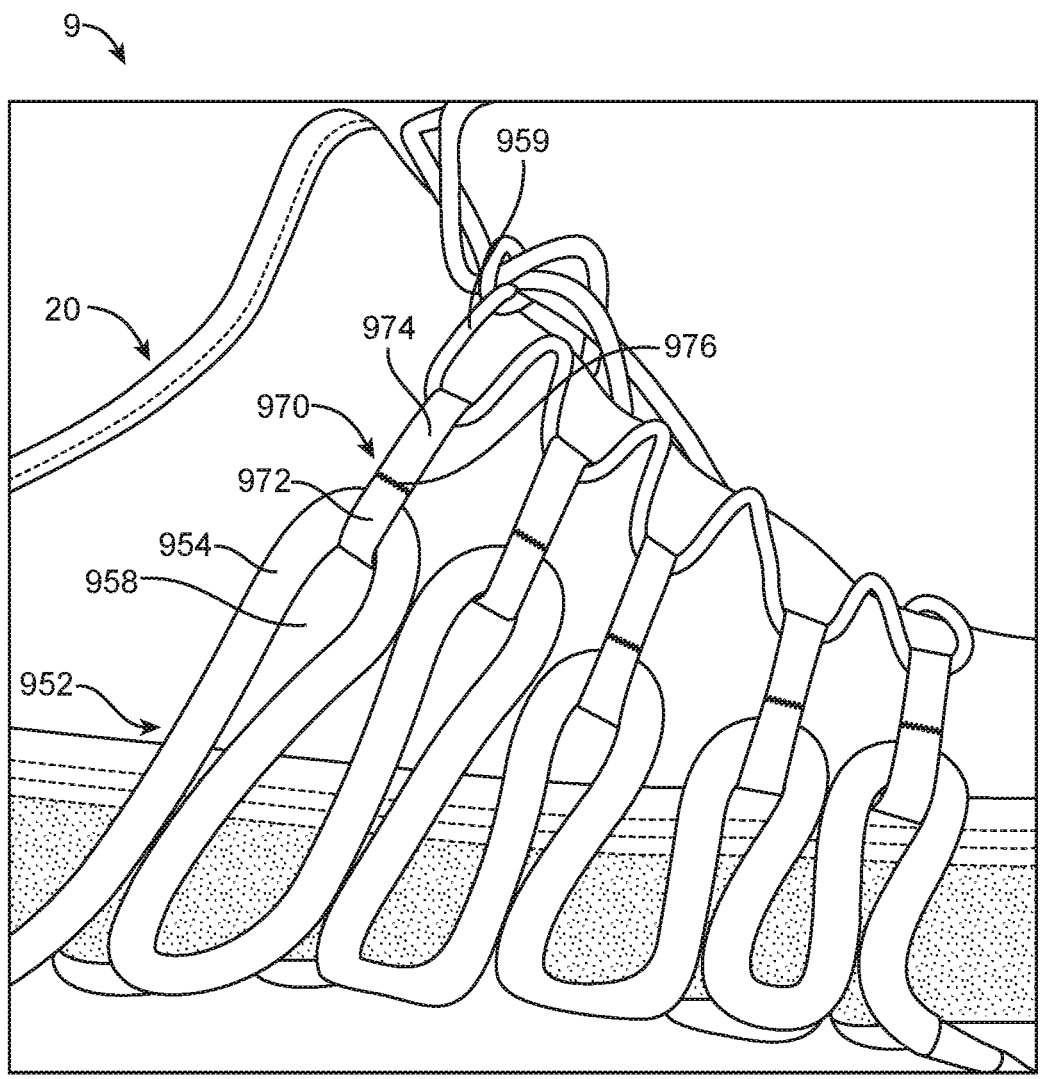
FIG. 41 illustrates an article of footwear according to an embodiment.
Figure 42:
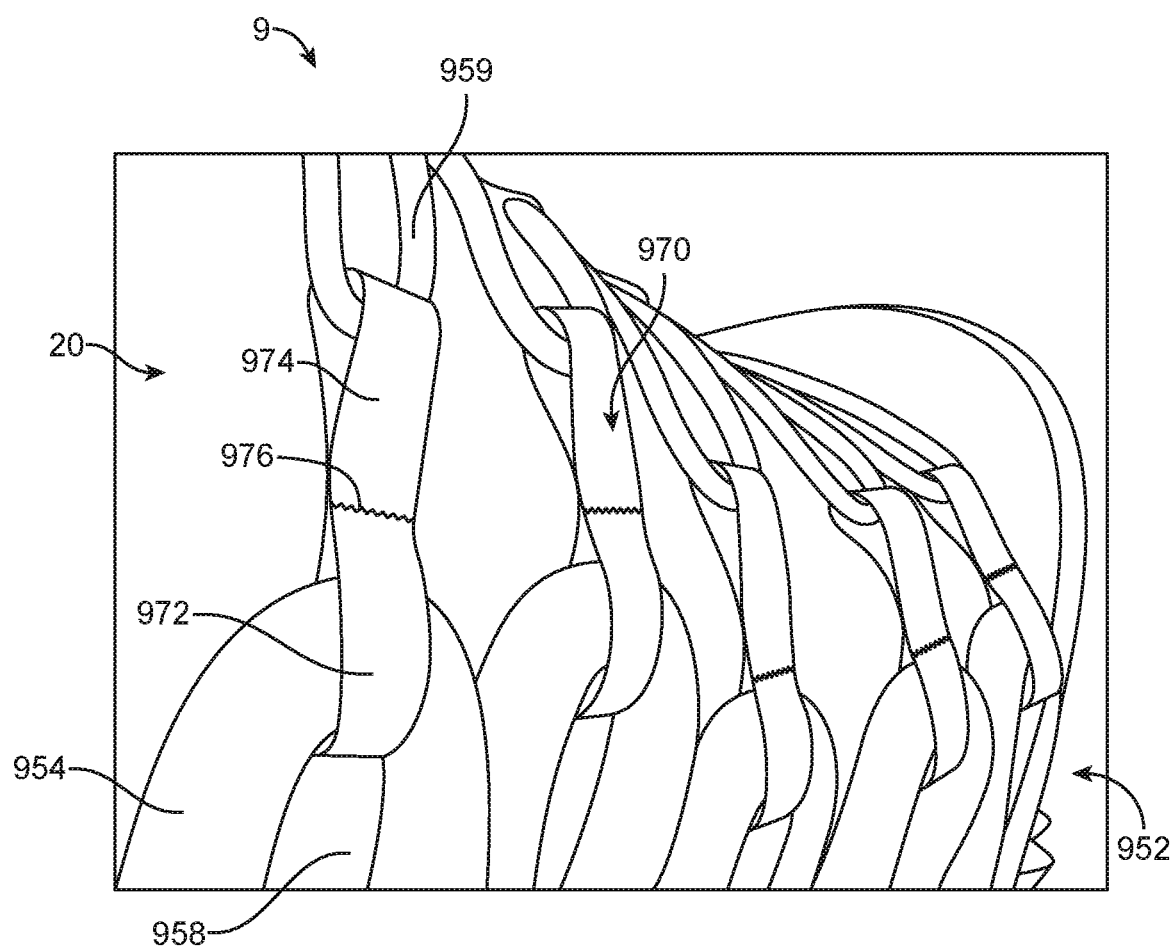
FIG. 42 illustrates a perspective view of an article of footwear according to an embodiment.

FIGS. 41 and 42 illustrate an article of footwear 9 according to an embodiment. Article of footwear 9 can include the same or similar components as shown, for example, in FIG. 37B. In certain embodiments, article of footwear 9 can include medial wing 950 and lateral wing 952. In certain embodiments, medial wing 950 and lateral wing 952 can be disposed or wrapped about an upper 20 made from, for example, fabric, mesh, or leather. FIGS. 41 and 42 also illustrate lace attachments 970 according to an embodiment.

In certain embodiments, one or more lace attachments 970 can be coupled to medial wing 950 and/or lateral wing 952. Lace attachments 970 can be configured to receive a lace 959 to secure article of footwear 9 to a wearer's foot. Lace attachments 970 can be made from, for example, fabric, mesh, plastic, woven materials, synthetic materials, or any other suitable material. In certain embodiments, lace attachment 970 can be coupled to an elongate member 954, for example, to a distal end of loop 958. In certain embodiments, lace attachments 970 can include a first loop 972 and a second loop 974. In certain embodiments, lace attachments 970 can be divided into first loop 972 and second loop 974 by, for example, stitching 976 or by an adhesive or other mechanical method of holding two sides of lace attachment 970 together. First loop 972 and second loop 974 can be the same size or different sizes. In certain embodiments, first loop 972 can be sized to fit snugly about elongated member 954. In certain embodiments, lace attachment 970 can be a single loop. In certain embodiments, lace attachment 970 can be a molded component. In certain embodiments, first loop 972 of lace attachment 970 can be coupled to loop 958 of medial wing 950 or lateral wing 952. In certain embodiments, second loop 974 can be configured to receive lace 959, for example, where lace 959 is threaded through second loop 974. By disposing lace attachments 970 on both medial wing 950 and lateral wing 952, lace 959 can be threaded through lace attachments 970 to secure article of footwear 9 to the wearer's foot.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A method of making a sole for an article of footwear, the method comprising:
   forming a carrier from a first material, the carrier comprising:
      an attachment surface configured to attach to an upper, and
      a receiving surface disposed on an opposite side of the carrier than the attachment surface, the receiving surface having a plurality of receptacles integrally formed with the carrier, wherein each of the plurality of receptacles comprises a protrusion extending from the receiving surface of the carrier, the protrusion having a sidewall defining a rim and an interior cavity; and
   extruding a second material into the plurality of receptacles such that the second material in each of the plurality of receptacles fills the interior cavity and extends beyond the rim.

2. The method of claim 1, wherein the carrier further comprises a cavity in the receiving surface of the carrier.

3. The method of claim 1, wherein the first material comprises thermoplastic and forming the carrier comprises vacuum forming a thermoplastic film or sheet.

4. The method of claim 1, wherein the first material comprises ethylene-vinyl acetate (EVA) and forming the carrier comprises injecting the first material into a mold.

5. The method of claim 1, wherein the second material comprises polyurethane elastomer or polyurethane foam.

6. The method of claim 1, further comprising curing the second material.

7. The method of claim 1, wherein the carrier comprises a forefoot region, a midfoot region, and a heel region, wherein one of the plurality of receptacles is disposed in the heel region and has an interior volume greater than one of the plurality of receptacles that is disposed in the midfoot region, and wherein the one of the plurality of receptacles that is disposed in the midfoot region has an interior volume greater than one of the plurality of receptacles that is disposed in the forefoot region.

8. The method of claim 1, wherein the carrier comprises a forefoot region, a midfoot region, and a heel region, and wherein one of the plurality of receptacles is disposed in the heel region and has a rim that follows a rear contour of the heel region.

9. The method of claim 1, wherein a majority of the receptacles have a circular rim.

10. The method of claim 1, wherein the plurality of receptacles comprises more than five receptacles.

11. The method of claim 1, further comprising determining a pressure profile of a foot, wherein the second material is deposited into the receptacles according to the pressure profile.

12. The method of claim 1, wherein the second material is configured to be an outsole of the sole.

13. The method of claim 1, further comprising disposing an outsole material on the second material.

14. A method of making an article of footwear, the method comprising:
   forming a carrier from a first material, the carrier comprising:
      an attachment surface configured to attach to an upper, and
      a receiving surface disposed on an opposite side of the carrier than the attachment surface, the receiving surface having a plurality of receptacles integrally formed with the carrier, wherein each of the plurality of receptacles comprises a protrusion extending from the receiving surface of the carrier, the protrusion having a sidewall defining a rim and an interior cavity;
   extruding a second material into the plurality of receptacles such that the second material in each of the plurality of receptacles fills the interior cavity and extends beyond the rim; and
   attaching the carrier to the upper.

15. The method of claim 14, wherein the carrier is attached to the upper by an adhesive.

16. The method of claim 14, wherein the attachment surface of the carrier is concave and attached to a bottom surface of the upper.

17. The method of claim 14, wherein the attachment surface comprises a sidewall configured to contact an exterior surface of the upper.

* * * * *